United States Patent
Park et al.

(10) Patent No.: US 10,164,482 B2
(45) Date of Patent: Dec. 25, 2018

(54) WIRELESS POWER TRANSFER METHOD, APPARATUS AND SYSTEM

(71) Applicant: LG ELECTRONICS INC., Seoul (KR)

(72) Inventors: Yongcheol Park, Seoul (KR); Jeongkyo Seo, Seoul (KR); Seonghun Lee, Seoul (KR); Bongsik Kwak, Seoul (KR); Jaesung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 251 days.

(21) Appl. No.: 15/024,243

(22) PCT Filed: Dec. 1, 2014

(86) PCT No.: PCT/KR2014/011648
§ 371 (c)(1),
(2) Date: Mar. 23, 2016

(87) PCT Pub. No.: WO2015/080539
PCT Pub. Date: Jun. 4, 2015

(65) Prior Publication Data
US 2016/0233728 A1    Aug. 11, 2016

Related U.S. Application Data

(60) Provisional application No. 61/910,420, filed on Dec. 1, 2013.

(30) Foreign Application Priority Data

Nov. 28, 2014    (KR) .................. 10-2014-0168926

(51) Int. Cl.
*H02J 7/00* (2006.01)
*H02J 50/80* (2016.01)
(Continued)

(52) U.S. Cl.
CPC .............. *H02J 50/80* (2016.02); *H02J 5/005* (2013.01); *H02J 7/025* (2013.01); *H02J 50/12* (2016.02);
(Continued)

(58) Field of Classification Search
USPC .......................... 320/106, 107, 108, 109, 110
See application file for complete search history.

(56) References Cited

U.S. PATENT DOCUMENTS

| 2006/0113955 A1 | 6/2006 | Nunally |
| 2007/0021140 A1 | 1/2007 | Keyes, IV et al. |

(Continued)

FOREIGN PATENT DOCUMENTS

| CN | 101442386 A | 5/2009 |
| CN | 103026774 A | 4/2013 |

(Continued)

OTHER PUBLICATIONS

Park et al., "Identification of RFID Tags in Framed-Slotted ALOHA with Robust Estimation and Binary Selection," IEEE Communications Letters, vol. 11, No. 5, May 2007, pp. 452-454.

*Primary Examiner* — Brian Ngo
(74) *Attorney, Agent, or Firm* — Birch, Stewart, Kolasch & Birch, LLP

(57) ABSTRACT

The present invention relates to a wireless power transmission method, a wireless power transmission apparatus, and a wireless charging system in a wireless power transmission field, and the wireless power transmission method may include receiving first information of a first wireless power receiver and second information of a second wireless power receiver that receive power in a wireless manner within a first slot among a plurality of slots, transmitting a NAK (not-acknowledge) signal to the first and the second wireless (Continued)

power receiver and executing a collision resolution mechanism in the first and the second wireless power receiver.

20 Claims, 14 Drawing Sheets

(51) Int. Cl.

| | | |
|---|---|---|
| *H02J 50/12* | (2016.01) | |
| *H02J 7/02* | (2016.01) | |
| *H02J 5/00* | (2016.01) | |
| *H04B 5/00* | (2006.01) | |
| *H04L 1/00* | (2006.01) | |
| *H04L 27/10* | (2006.01) | |
| *H04L 5/14* | (2006.01) | |
| *H04L 1/18* | (2006.01) | |

(52) U.S. Cl.
CPC ......... *H04B 5/0031* (2013.01); *H04B 5/0037* (2013.01); *H04B 5/0081* (2013.01); *H04L 1/00* (2013.01); *H04L 27/10* (2013.01); *H04L 1/1854* (2013.01); *H04L 5/14* (2013.01)

(56) References Cited

U.S. PATENT DOCUMENTS

| | | |
|---|---|---|
| 2008/0039022 A1 | 2/2008 | Wei et al. |
| 2010/0085190 A1 | 4/2010 | Sueoka |
| 2012/0153742 A1* | 6/2012 | Lee .................. G06K 19/0701 |
| | | 307/104 |
| 2012/0306284 A1 | 12/2012 | Lee et al. |
| 2012/0329405 A1* | 12/2012 | Lee ........................ H02J 17/00 |
| | | 455/73 |

FOREIGN PATENT DOCUMENTS

| | | |
|---|---|---|
| JP | 2010-78838 A | 4/2010 |
| JP | 2013-10610 A | 4/2013 |
| KR | 10-2012-0134998 A | 12/2012 |
| KR | 10-2013-0087981 A | 8/2013 |
| KR | 10-2013-0127386 A | 11/2013 |
| WO | WO 2008/056415 A1 | 5/2008 |

* cited by examiner

[Fig. 1]
[Fig. 2a]
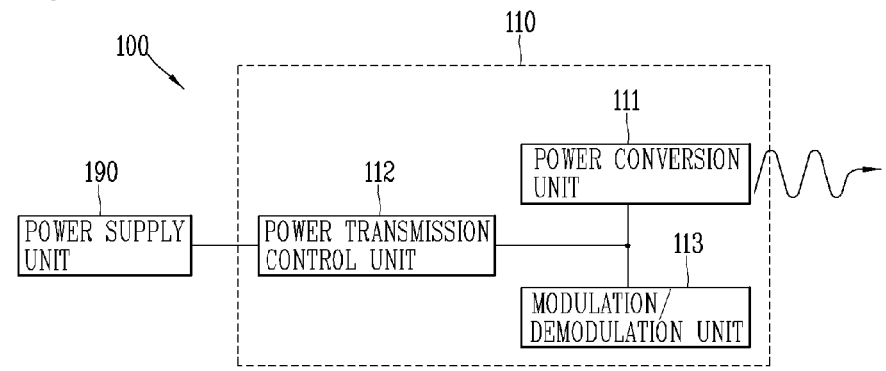
[Fig. 2b]
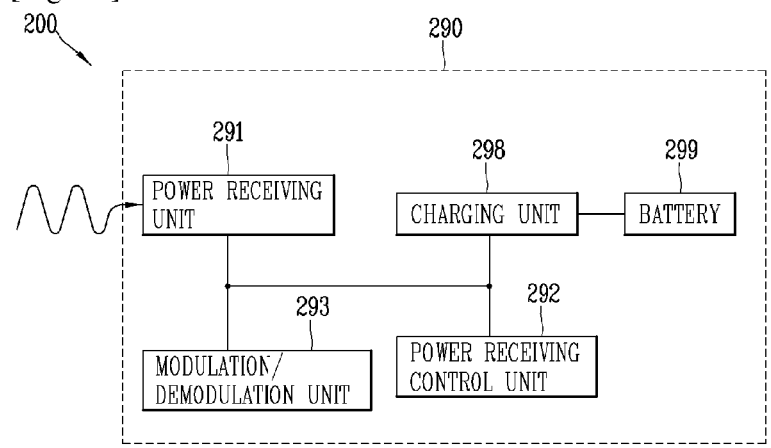
[Fig. 3]
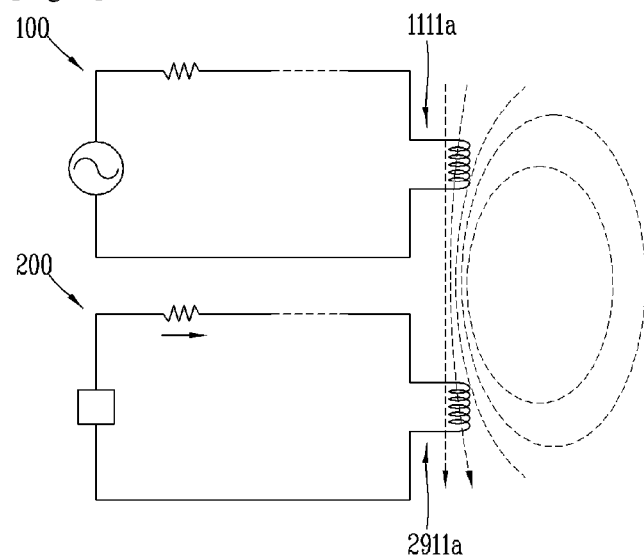

[Fig. 4a]
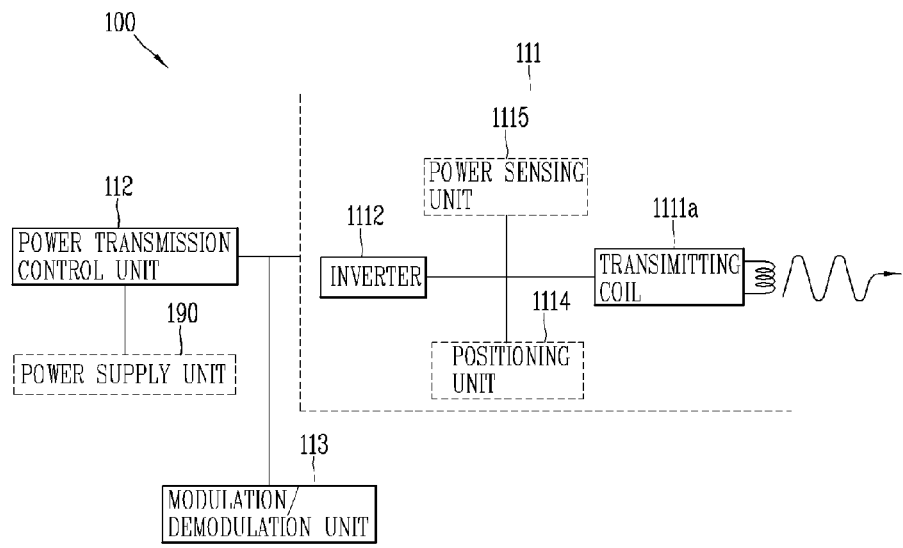
[Fig. 4b]
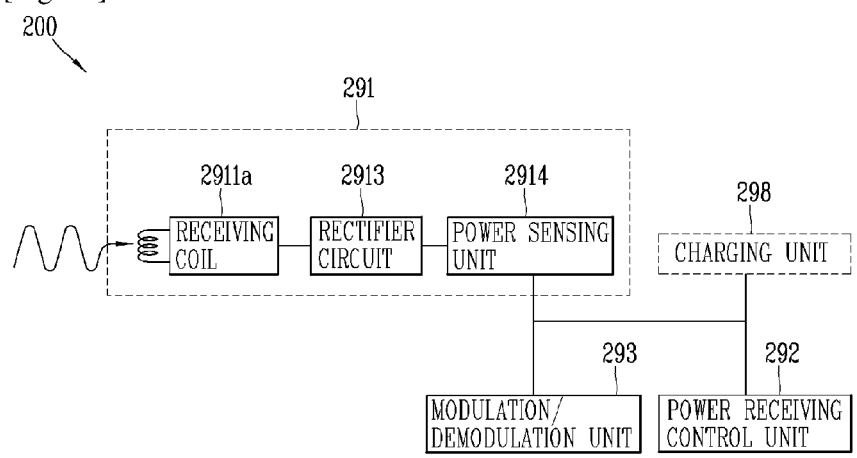
[Fig. 5]
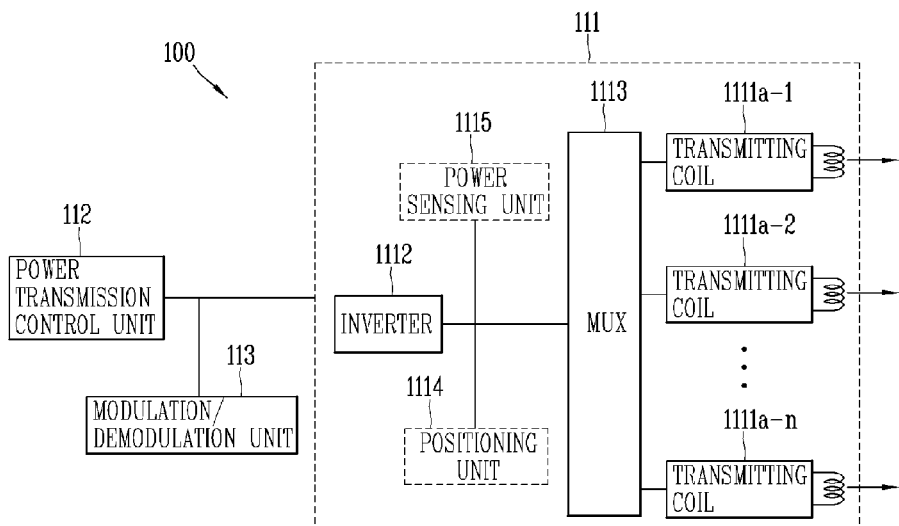

[Fig. 6]
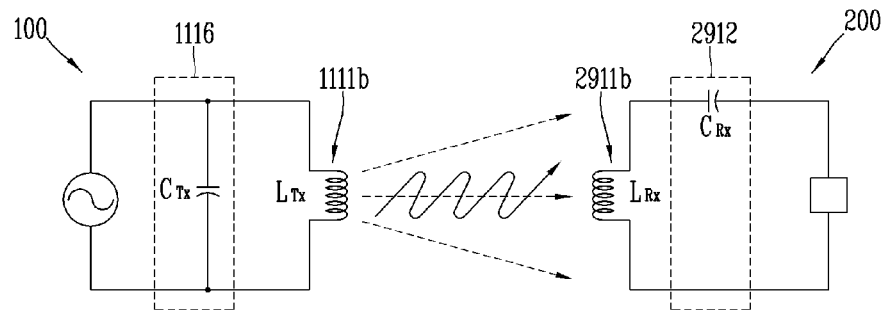
[Fig. 7a]
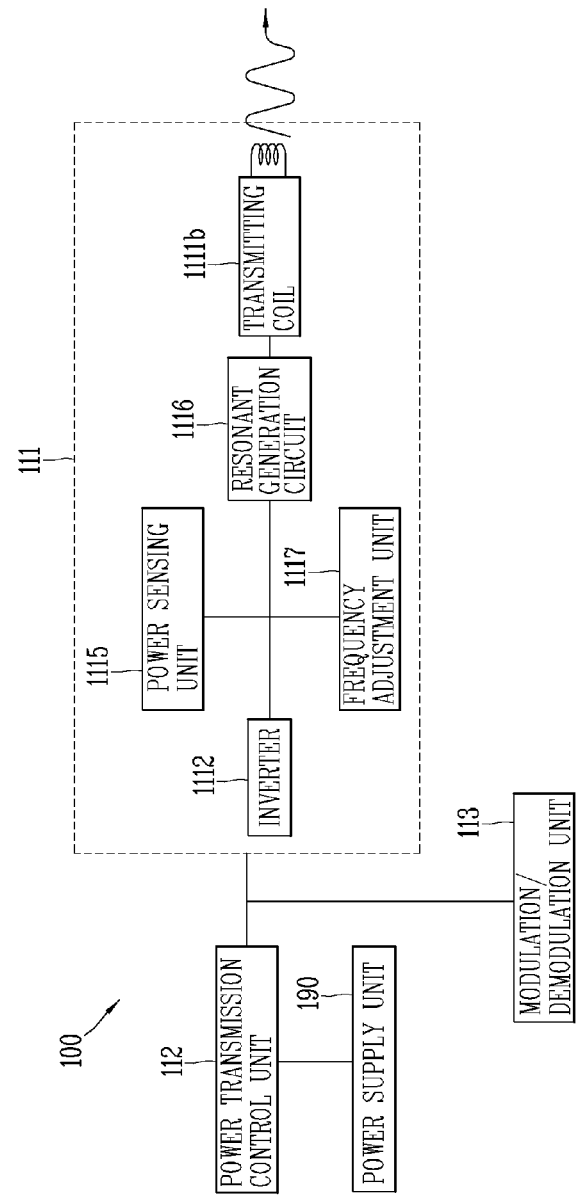

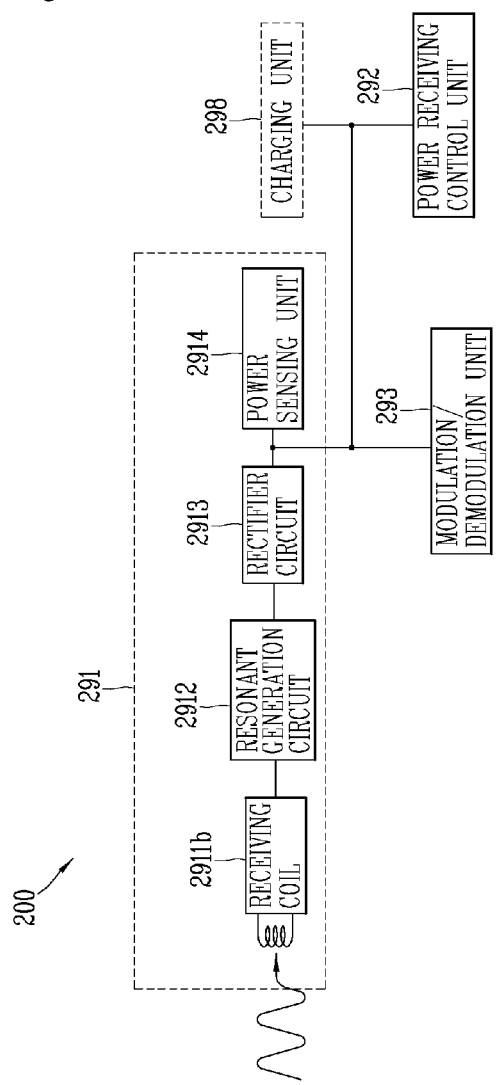
[Fig. 7b]

[Fig. 8]
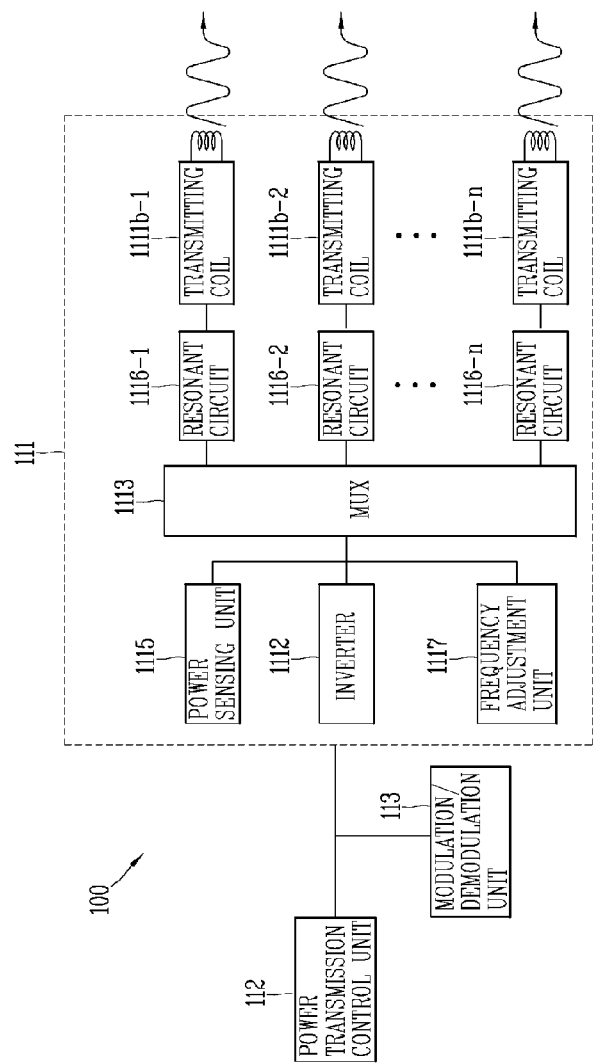
[Fig. 9]
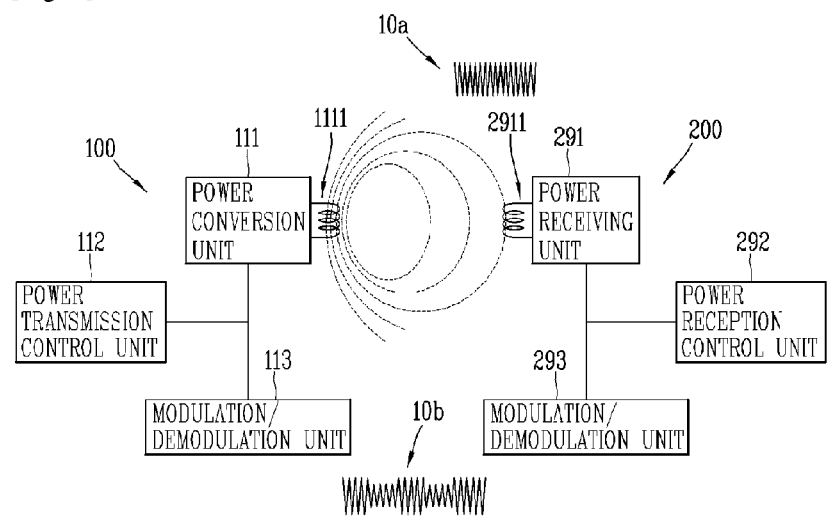

[Fig. 10]
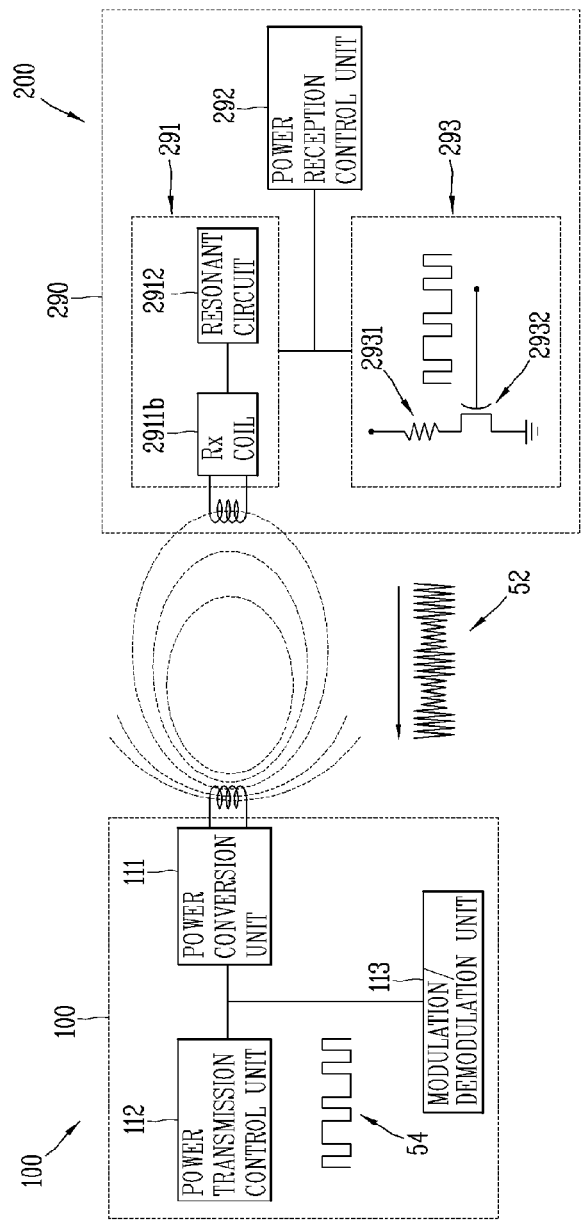
[Fig. 11a]
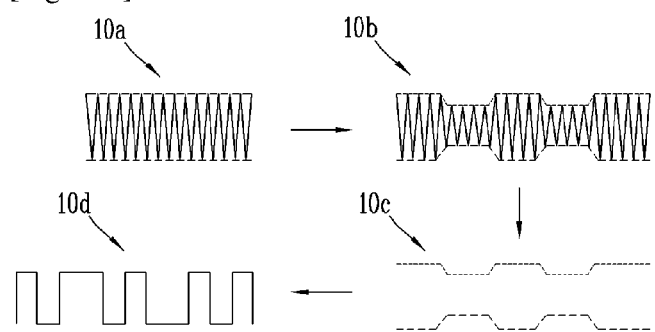

[Fig. 11b]
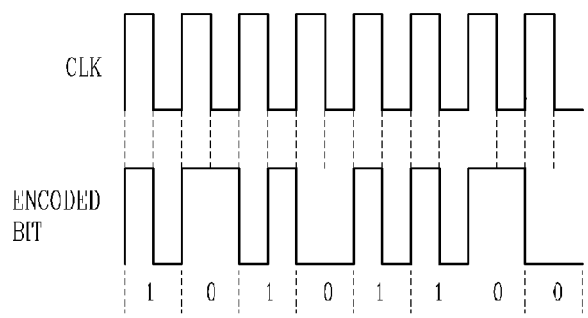
[Fig. 11c]
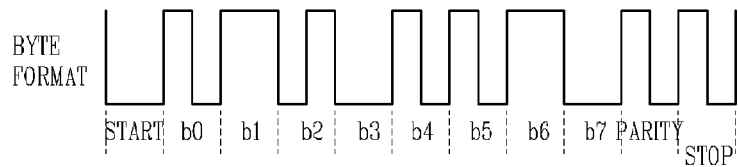
[Fig. 12a]
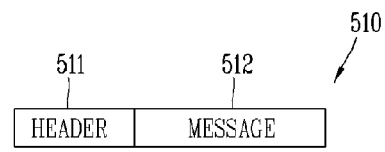
[Fig. 12b]
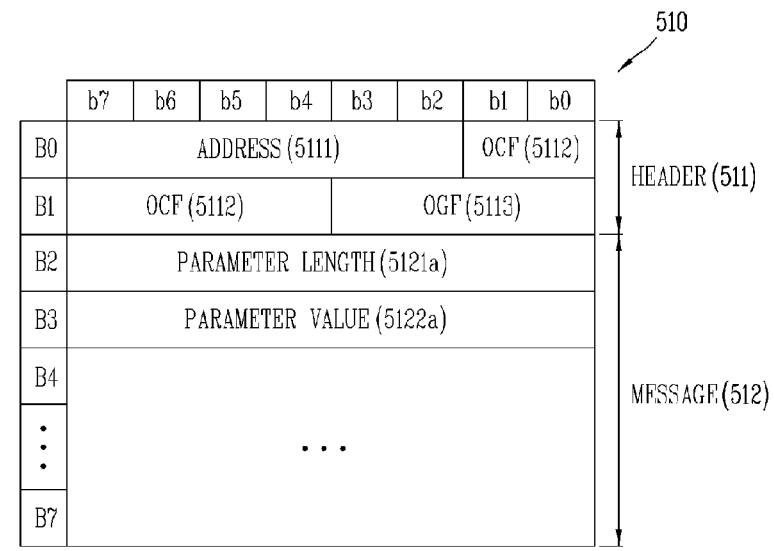
[Fig. 12c]
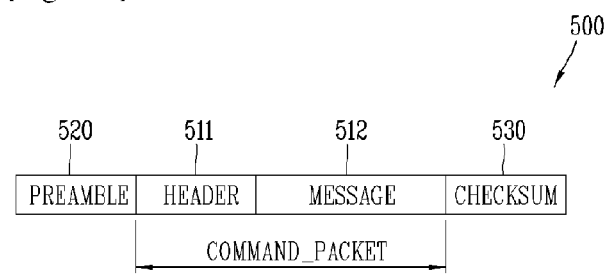

[Fig. 13]
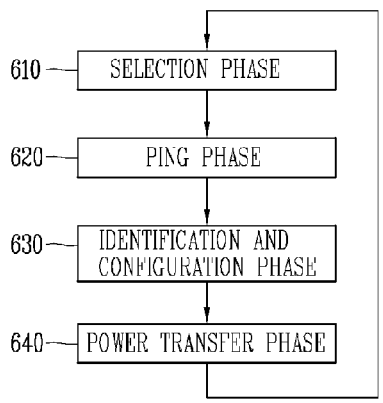
[Fig. 14]
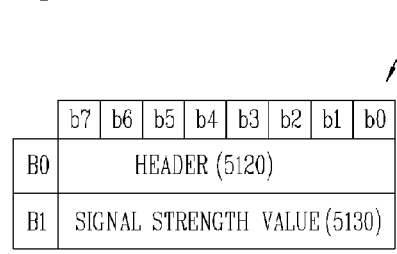
[Fig. 15a]
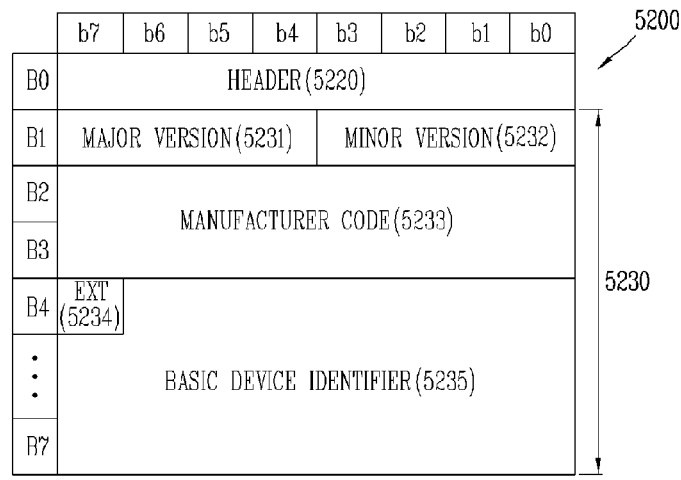
[Fig. 15b]
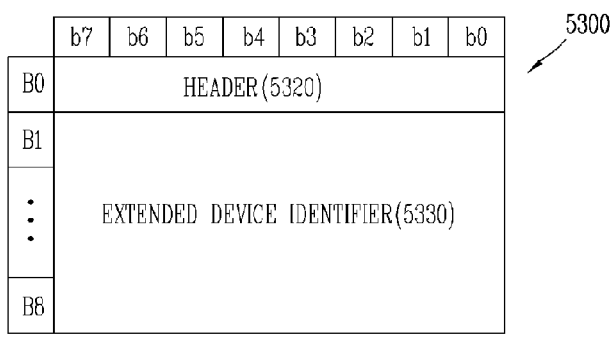

[Fig. 16]
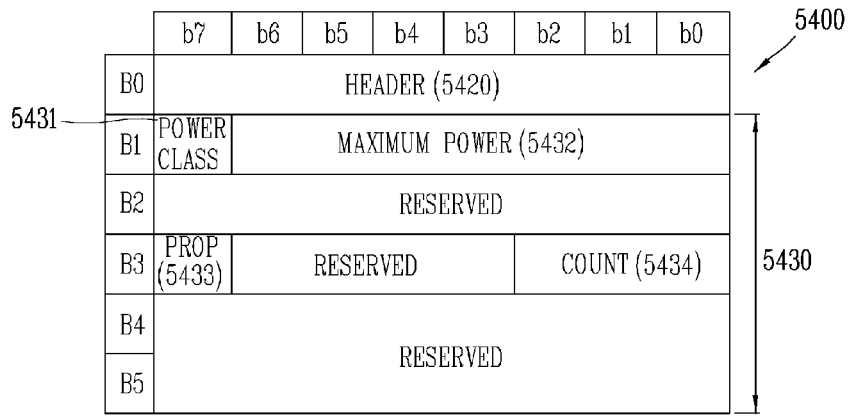
[Fig. 17]
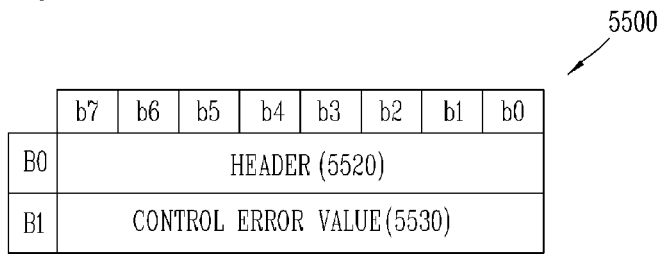
[Fig. 18]
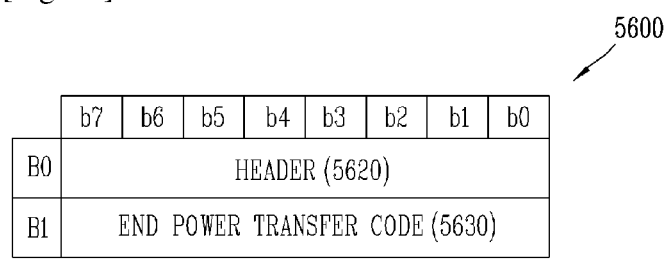

[Fig. 19]
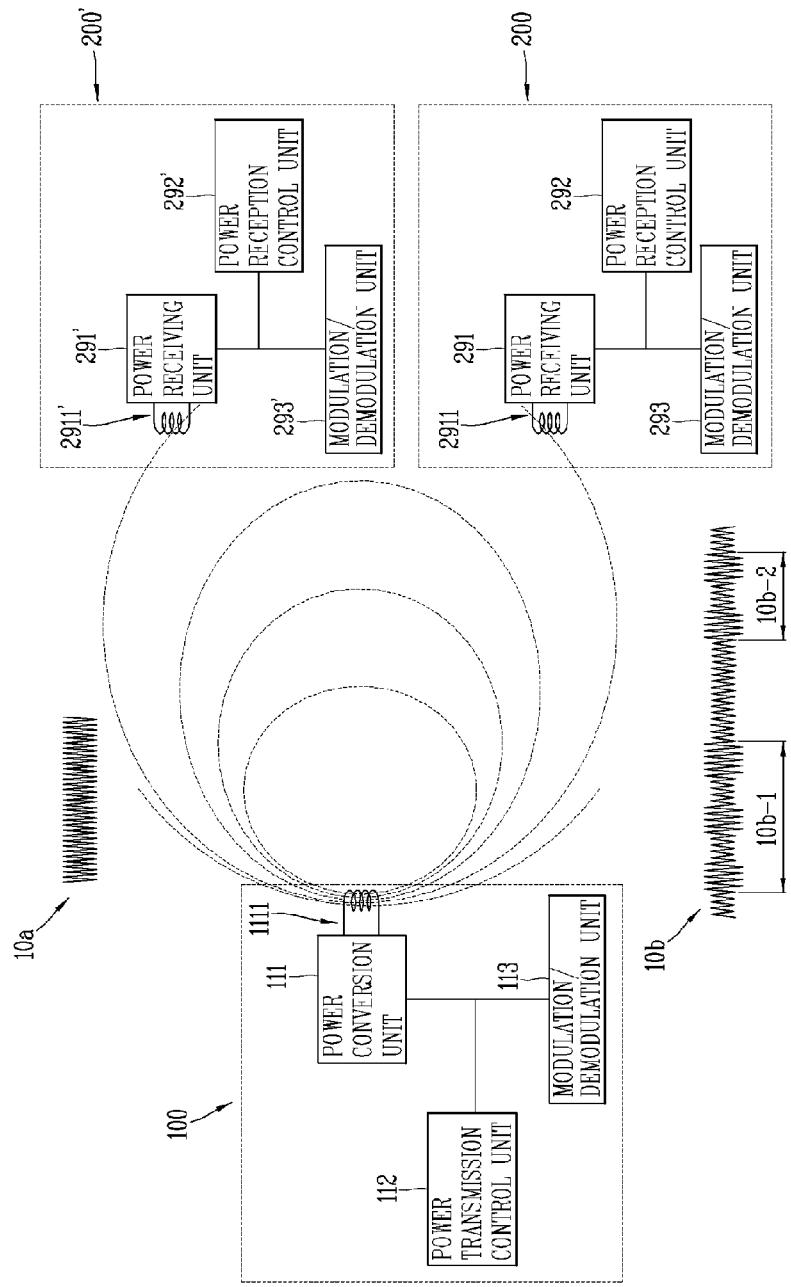
[Fig. 20a]
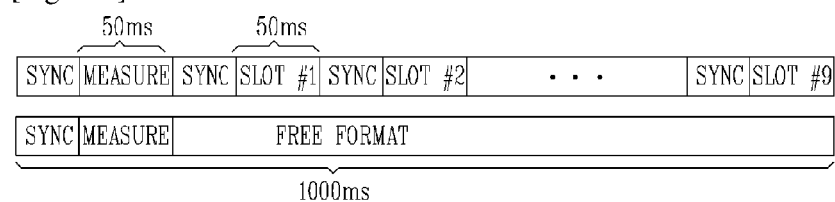
[Fig. 20b]
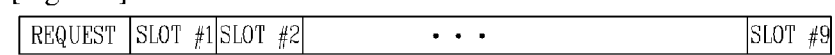

[Fig. 21]

| PREAMBLE | ZERO | RESPONSE | SYNC | USAGE | PARITY |

RESPONSE
'00': NO COMMS
'01': COMMS ERROR
'10': NAK
'11': ACK

SYNC
ZERO: SLOT SYNC
ONE: FRAME SYNC

PARITY: ODD

USAGE(SYNC IS ZERO)
'00': ALLOCATED
'01': LOCKED
'10': FREE
'01': RESERVED

USAGE(SYNC IS ONE)
'00': SLOTTED
'01': FREE FORMAT
'10': RESERVED
'11': RESERVED

[Fig. 22]

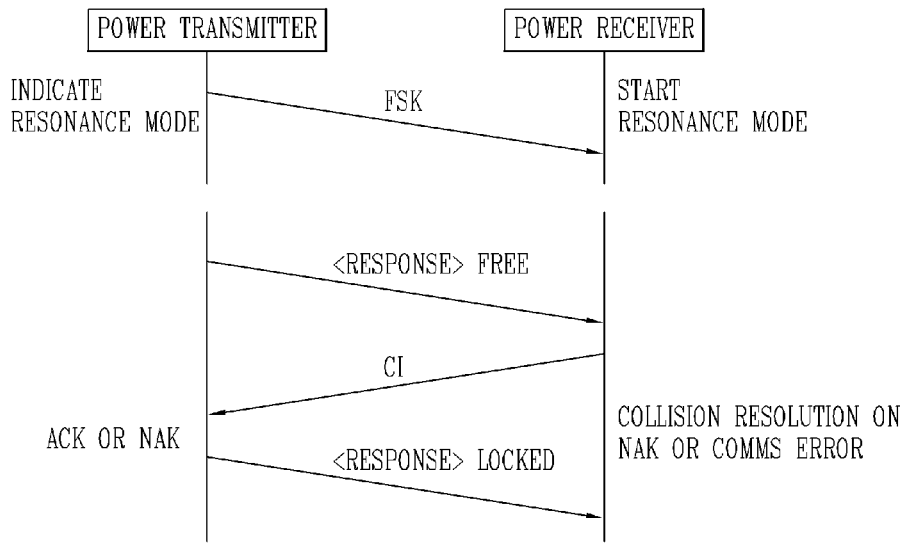

[Fig. 23]

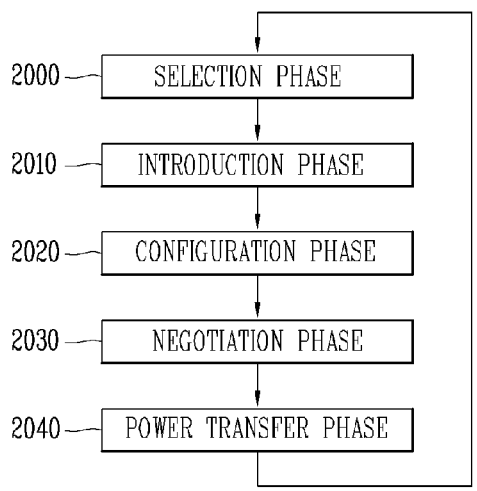

2000 — SELECTION PHASE
2010 — INTRODUCTION PHASE
2020 — CONFIGURATION PHASE
2030 — NEGOTIATION PHASE
2040 — POWER TRANSFER PHASE

[Fig. 24]
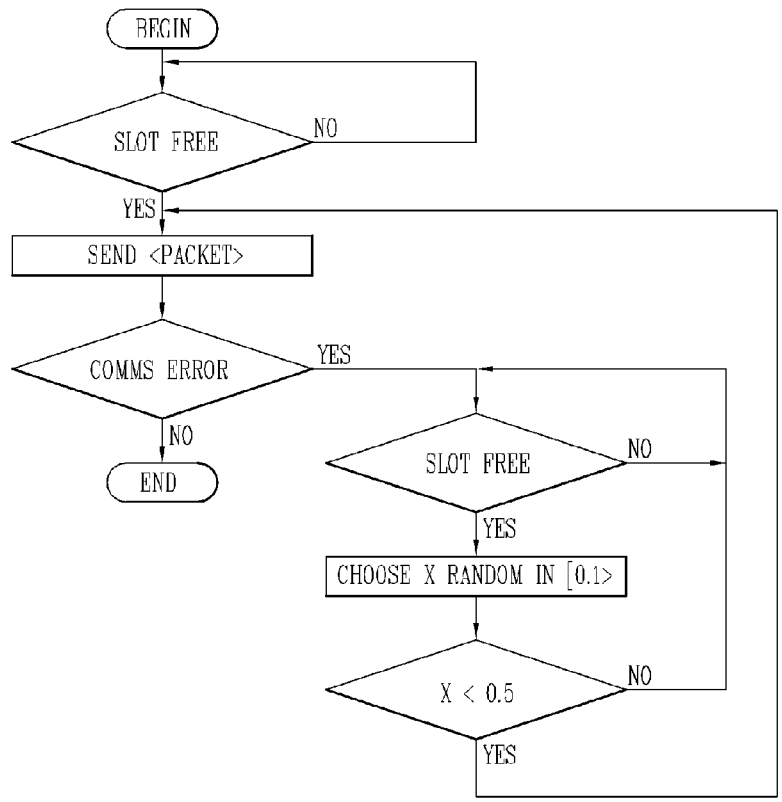
[Fig. 25a]
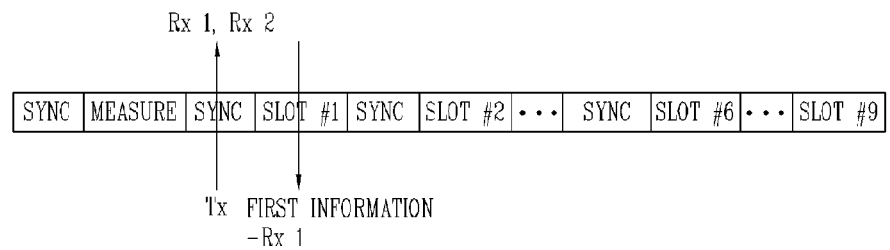
[Fig. 25b]
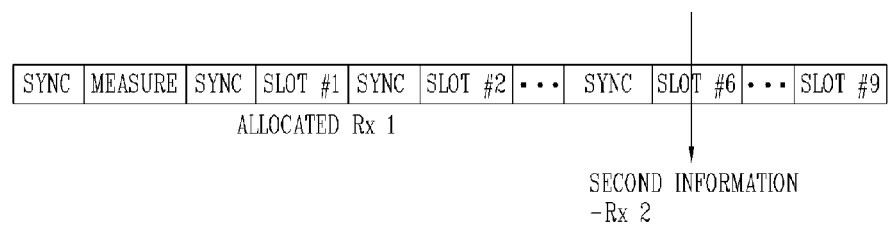
[Fig. 26a]
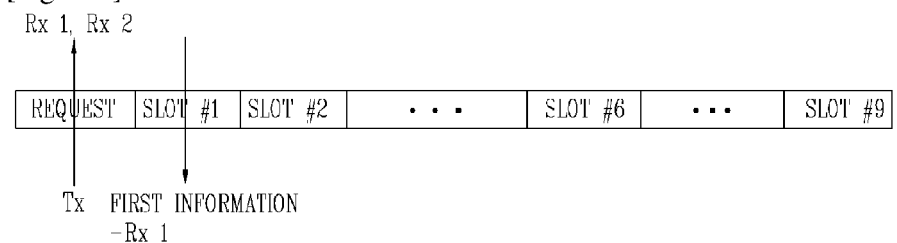

[Fig. 26b]
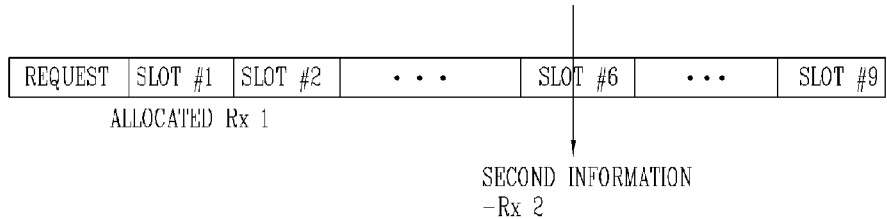
[Fig. 27a]
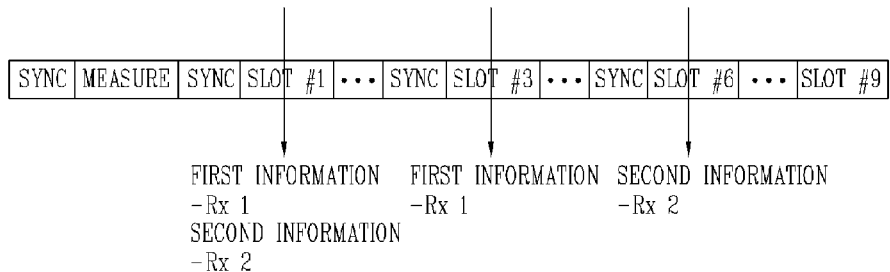
[Fig. 27b]
[Fig. 28a]
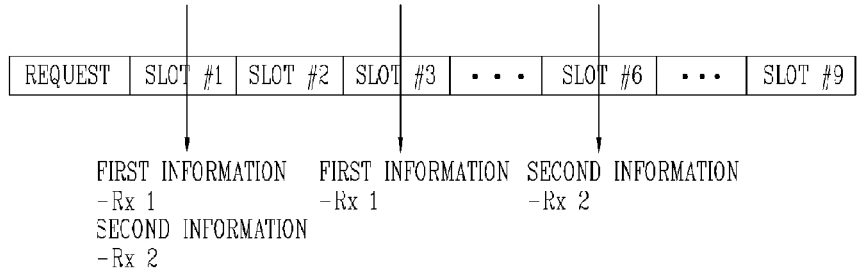
[Fig. 28b]
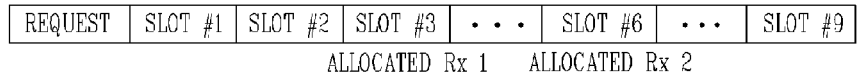
[Fig. 29a]
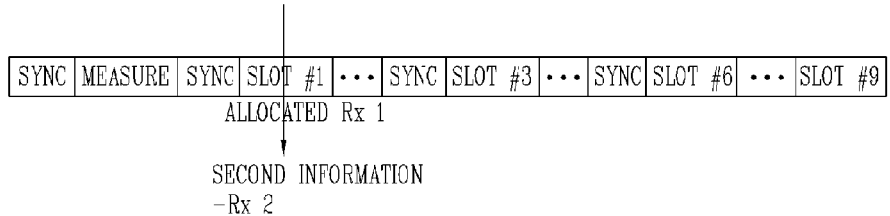
[Fig. 29b]
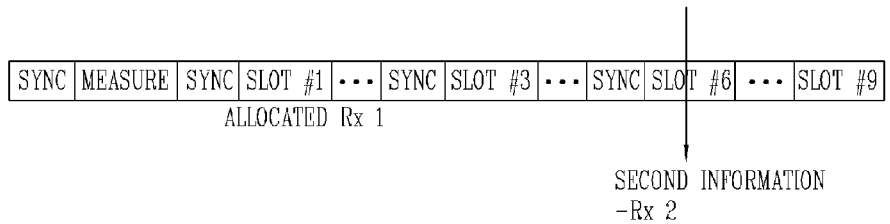

[Fig. 30a]
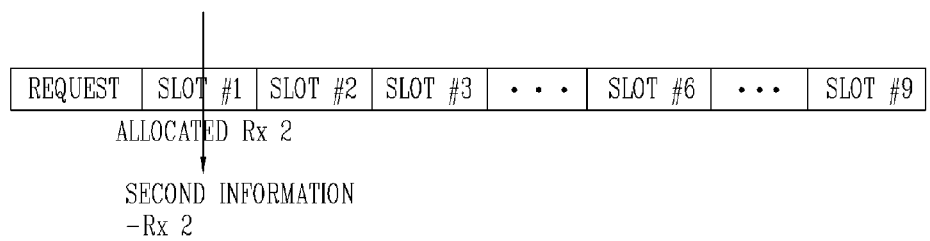
[Fig. 30b]
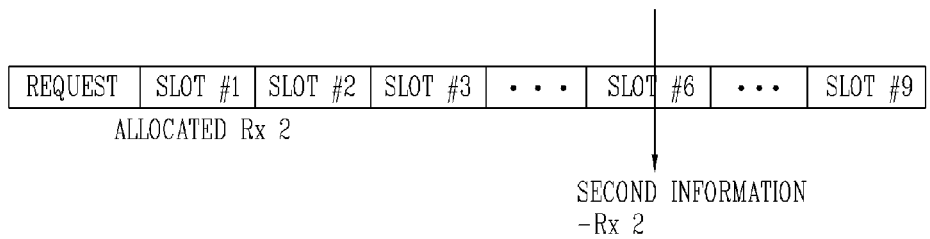

WIRELESS POWER TRANSFER METHOD, APPARATUS AND SYSTEM

TECHNICAL FIELD

The present invention relates to a wireless power transfer method, a wireless power transfer apparatus, and a wireless charging system in a wireless power transfer field.

BACKGROUND ART

In recent years, the method of contactlessly supplying electrical energy to wireless power receivers in a wireless manner has been used instead of the traditional method of supplying electrical energy in a wired manner. The wireless power receiver receiving energy in a wireless manner may be directly driven by the received wireless power, or a battery may be charged by using the received wireless power, then allowing the wireless power receiver to be driven by the charged power.

For allowing smooth wireless power transfer between a wireless power transmitter which transmits power in a wireless manner and a wireless power receiver which receives power in a wireless manner, the standardization for a technology related to the wireless power transfer is undergoing.

As part of the standardization for the wireless power transfer technology, the Wireless Power Consortium (WPC) which manages technologies for a magnetic inductive wireless power transfer has published a standard document "System description Wireless Power Transfer, Volume 1, Low Power, Part 1: Interface Definition, Version 1.00 Release Candidate 1 (RC1)" for interoperability in the wireless power transfer on Apr. 12, 2010.

Power Matters Alliance as another technology standardization consortium has been established on March 2012, developed a product line of interface standards, and published a standard document based on an inductive coupling technology for providing inductive and resonant power.

A wireless charging method using electromagnetic induction is frequently encountered in our lives, for example, is utilized by being commercialized in electric toothbrushes, wireless coffee ports and the like.

On the other hand, the WPC standard prescribes a method of performing communication between a wireless power transmitter and a wireless power receiver. At present, a communication scheme prescribed by the WPC standard, as a one-to-one communication scheme, discloses a scheme in which communication is carried out between one wireless power transmitter and one wireless power receiver.

Accordingly, the present invention provides a communication method of a wireless power transmitter for performing communication with a plurality of wireless power receivers as well as one-to-one communication scheme.

DISCLOSURE OF INVENTION

Technical Problem

An aspect of the present invention is to provide a wireless power transmitter and receiver capable of selecting a different communication method as needed based on the existing communication method prescribed in the WPC standard.

Furthermore, another aspect of the present invention is to provide a method of exchanging connection information using the existing communication method prescribed in the WPC standard between any wireless power transmitter and receivers with no mutual communication connection information.

In addition, still another object of the present invention is to guarantee one-to-one communication between devices using connection information.

Solution to Problem

The present disclosure relates to a method of performing communication between a wireless power transmitter and a wireless power receiver, there is provided a communication method of a wireless power transmitter capable of the transmission of power in a wireless manner, and the communication method may include receiving first information of a first wireless power receiver and second information of a second wireless power receiver that receive power in a wireless manner within a first slot among a plurality of slots, transmitting a NAK (not-acknowledge) signal to the first and the second wireless power receiver and executing a collision resolution mechanism in the first and the second wireless power receiver.

According to an embodiment, the first slot is not allocated to the first and the second wireless power receiver that have received the NAK signal.

According to an embodiment, the first signal is received within a second slot different from the first slot among a plurality of slots from the first wireless power receiver subsequent to executing the collision resolution mechanism.

According to an embodiment, an ACK signal is transmitted to the firsts wireless power receiver when the second slot is allocatable.

According to an embodiment, a NAK signal is transmitted to the first wireless power receiver when the second slot is in a non-allocatable state.

According to an embodiment, the second slot is allocated to the first wireless power receiver when the first signal is received within the second slot.

According to an embodiment, the wireless power transmitter performs communication with the first wireless power receiver within the second slot.

According to an embodiment, the second wireless power receiver is allocated to the third slot when the second signal is received within a third slot different from the first and the second slot.

According to an embodiment, the wireless power transmitter performs communication with the second wireless power receiver through the third slot when the third slot is allocated thereto.

According to an embodiment, transmitting a FSK signal to a first and a second wireless power receiver.

According to an embodiment, the wireless power transmitter performs communication with the first and the second wireless power receiver in a time division multiplexing scheme using the plurality of slots.

According to an embodiment, a wireless power transmitter for transmitting power in a wireless manner, the wireless power transmitter may include a power transmission unit configured to transmit power in a wireless manner and a power transmission controller configured to receive a first signal of a first wireless power receiver and a second signal of a second wireless power receiver that receive power in a wireless manner within a first slot among a plurality of slots, and transmit a NAK signal to the first and the second wireless power receiver.

According to an embodiment, the power transmission controller allocates the second slot to the first wireless power receiver when a first signal is received within a second slot different from the first slot subsequent to transmitting the NAK signal.

According to an embodiment, the power transmission controller transmits an ACK signal to the first wireless power receiver when a first signal is received within the second slot.

According to an embodiment, the third slot is allocated to the second wireless power receiver when a second signal is received within a third slot different from the first and the second slot subsequent to transmitting the NAK signal.

A wireless charging system, may include a transmitter formed to transmit wireless power and a first and a second receiver formed to receive wireless power from the transmitter, wherein the transmitter transmits a NAK signal to the first and the second receiver when a first signal received from the first receiver and a second signal received from the second receiver are received within a first slot among a plurality of slots, and the first and the second receiver executes a collision resolution mechanism upon receiving the NAK signal.

According to an embodiment, the first receiver transmits a first signal to the transmitter through a second slot different from the first slot subsequent to executing the collision resolution mechanism, and the transmitter allocates the second slot to the first receiver when a first signal is transmitted within the second slot.

According to an embodiment, the transmitter transmits an ACK signal to the first receiver when the second slot is allocated to the first receiver.

According to an embodiment, the first receiver performs communication with the transmitter using the second slot when the second slot is allocated to the first receiver.

According to an embodiment, the transmitter transmits a FSK signal to the first and the second receiver.

BRIEF DESCRIPTION OF DRAWINGS

FIG. 1 is an exemplary view conceptually illustrating a wireless power transmitter and a wireless power receiver according to the embodiments of the present invention.

FIGS. 2A and 2B are exemplary block diagrams illustrating the configuration of a wireless power transmitter and a wireless power receiver that can be employed in the embodiments disclosed herein, respectively.

FIG. 3 is a view illustrating a concept in which power is transferred from a wireless power transmitter to a wireless power receiver in a wireless manner according to an inductive coupling method.

FIGS. 4A and 4B are block diagrams illustrating part of the wireless power transmitter and wireless power receiver in a magnetic induction method that can be employed in the embodiments disclosed herein.

FIG. 5 is a block diagram illustrating a wireless power transmitter configured to have one or more transmitting coils receiving power according to an inductive coupling method that can be employed in the embodiments disclosed herein.

FIG. 6 is a view illustrating a concept in which power is transferred to a wireless power receiver from a wireless power transmitter in a wireless manner according to a resonance coupling method.

FIGS. 7A and 7B are block diagrams illustrating part of the wireless power transmitter and wireless power receiver in a resonance method that can be employed in the embodiments disclosed herein.

FIG. 8 is a block diagram illustrating a wireless power transmitter configured to have one or more transmitting coils receiving power according to a resonance coupling method that can be employed in the embodiments disclosed herein.

FIG. 9 a view illustrating a concept of transmitting and receiving a packet between a wireless power transmitter and an electronic device through the modulation and demodulation of a wireless power signal in transferring power in a wireless manner disclosed herein.

FIG. 10 is a view illustrating a configuration of transmitting and receiving a power control message in transferring power in a wireless manner disclosed herein.

FIGS. 11A, 11B and 11C is a view illustrating forms of signals upon modulation and demodulation executed in a wireless power transfer disclosed herein.

FIGS. 12A, 12B, and 12C is a view illustrating a packet including a power control message used in a contactless (wireless) power transfer method according to the embodiments disclosed herein.

FIG. 13 is a view illustrating operation phases of the wireless power transmitter and wireless power receiver according to the embodiments disclosed herein.

FIGS. 14 to 18 are views illustrating the structure of packets including a power control message between the wireless power transmitter 100 and the wireless power receiver.

FIG. 19 is a conceptual view illustrating a method of transferring power to at least one wireless power receiver from a wireless power transmitter.

FIGS. 20A and 20B are conceptual views illustrating a frame structure for performing communication according to the present invention.

FIG. 21 is a conceptual view illustrating a sync pattern according to the present invention.

FIG. 22 is a view illustrating the operation states of a wireless power transmitter and a wireless power receiver that perform many-to-one communication.

FIG. 23 is a view illustrating a communication method for the slot allocation of a wireless power transmitter and a wireless power receiver that perform many-to-one communication.

FIG. 24 is a flow chart illustrating a collision solving mechanism in a wireless power receiver according to the present invention.

FIGS. 25A, 25B, 26A, 26B, 27A, 27B, 28A, 28B, 29A, 29B, 30A and 30B are views illustrating a method of allocating a slot in a wireless power transmitter according to the present invention.

MODE FOR THE INVENTION

The technologies disclosed herein may be applicable to wireless power transfer (or wireless power transmission). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

DEFINITION

Many-to-one communication: communicating between one transmitter (Tx) and many receivers (Rx)

Unidirectional communication: transmitting a required message only from a receiver to a transmitter Bidirectional communication: allowing message transmission from a transmitter to a receiver and from the receiver to the transmitter, namely, at both sides Here, the transmitter and the receiver indicate the same as a transmitting unit (device) and a receiving unit (device), respectively. Hereinafter, those terms may be used together.

Conceptual View of Wireless Power Transmitter and Wireless Power Receiver

FIG. 1 is an exemplary view conceptually illustrating a wireless power transmitter and a wireless power receiver according to the embodiments of the present invention.

Referring to FIG. 1, a wireless power transmitter 100 may be a power transfer apparatus configured to transfer power required for a wireless power receiver 200 in a wireless manner.

Furthermore, the wireless power transmitter 100 may be a wireless charging apparatus configured to charge a battery of the wireless power receiver 200 by transferring power in a wireless manner.

Additionally, the wireless power transmitter 100 may be implemented with various forms of apparatuses transferring power to the wireless power receiver 200 requiring power in a contactless state.

The wireless power receiver 200 is a device that is operable by receiving power from the wireless power transmitter 100 in a wireless manner. Furthermore, the wireless power receiver 200 may charge a battery using the received wireless power.

On the other hand, the wireless power receiver for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The wireless power receiver 200, as described later, may be a mobile communication terminal (for example, a portable phone, a cellular phone, a tablet and the like) or a multimedia device.

On the other hand, the wireless power transmitter 100 may transfer power in a wireless manner without mutual contact to the wireless power receiver 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the wireless power receiver 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and wireless power receiver 200 according to the embodiments disclosed herein will be described in detail. In assigning reference numerals to the constituent elements in each of the following drawings, the same reference numerals will be used for the same constituent elements even though they are shown in a different drawing.

FIGS. 2A and 2B are exemplary block diagrams illustrating the configuration of a wireless power transmitter 100 and a wireless power receiver 200 that can be employed in the embodiments disclosed herein.

Wireless Power Transmitter

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the wireless power receiver 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method. For example, the power conversion unit 111 may include a primary coil for forming a changing magnetic field to induce a current to a secondary coil of the wireless power receiver 200. Furthermore, the power conversion unit 111 may include a coil (or antenna) for forming a magnetic field having a specific resonant frequency to generate a resonant frequency in the wireless power receiver 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110. The power transmission control unit 112 may be implemented to be integrated into another control unit (not shown) for controlling the wireless power transmitter 100.

On the other hand, a region which the wireless power signal can be approached may be divided into two types. First, an active area denotes a region through which a wireless power signal transferring power to the wireless power receiver 200 is passed. Next, a semi-active area denotes an interest region in which the wireless power transmitter 100 can detect the existence of the wireless power receiver 200. Here, the power transmission control unit 112 may detect whether the wireless power receiver 200 is placed in the active area or detection area or removed from the area. Specifically, the power transmission control unit 112 may detect whether or not the wireless power receiver 200 is placed in the active area or detection area using a wireless power signal formed from the power conversion unit 111 or a sensor separately provided therein. For instance, the power transmission control unit 112 may detect the presence of the wireless power receiver 200 by monitoring whether or not the characteristic of power for forming the wireless power signal is changed by the wireless power signal, which is affected by the wireless power receiver 200 existing in the detection area. However, the active area and detection area may vary according to the wireless power transfer method such as an inductive coupling method, a resonance coupling method, and the like.

The power transmission control unit 112 may perform the process of identifying the wireless power receiver 200 or determine whether to start wireless power transfer according to a result of detecting the existence of the wireless power receiver 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the wireless power receiver 200.

The power transmission control unit 112 may receive a power control message from the wireless power receiver 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the wireless power receiver 200.

Furthermore, as another control operation using the power control message, the wireless power transmitter 100 may perform a typical control operation associated with wireless power transfer based on the power control message. For example, the wireless power transmitter 100 may receive information associated with the wireless power receiver 200 to be auditorily or visually outputted through the power control message, or receive information required for authentication between devices.

In exemplary embodiments, the power transmission control unit 112 may receive the power control message through the wireless power signal. In other exemplary embodiment, the power transmission control unit 112 may receive the power control message through a method for receiving user data.

In order to receive the foregoing power control message, the wireless power transmitter 100 may further include a modulation/demodulation unit 113 electrically connected to the power conversion unit 111. The modulation/demodulation unit 113 may demodulate a wireless power signal that has been modulated by the wireless power receiver 200 and use it to receive the power control message.

In addition, the power transmission control unit 112 may acquire a power control message by receiving user data including the power control message by a communication means (not shown) included in the wireless power transmitter 100.

[For Supporting in-band Two-Way Communication]

Under a wireless power transfer environment allowing for bi-directional communications according to the exemplary embodiments disclosed herein, the power transmission control unit 112 may transmit data to the wireless power receiver 200. The data transmitted by the power transmission control unit 112 may be transmitted to request the wireless power receiver 200 to send the power control message.

Wireless Power Receiver

Referring to FIG. 2B, the wireless power receiver 200 may include a power supply unit 290. The power supply unit 290 supplies power required for the operation of the wireless power receiver 200. The power supply unit 290 may include a power receiving unit 291 and a power reception control unit 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having a vibration characteristic.

For instance, as a constituent element according to the inductive coupling method, the power receiving unit 291 may include a secondary coil to which a current is induced by a changing magnetic field. In exemplary embodiments, the power receiving unit 291, as a constituent element according to the resonance coupling method, may include a coil and a resonant circuit in which resonance phenomenon is generated by a magnetic field having a specific resonant frequency.

In another exemplary embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIGS. 4A and 4B, and those for the resonance coupling method with reference to FIGS. 7A and 7B.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The power reception control unit 292 may control each constituent element included in the power supply unit 290.

Specifically, the power reception control unit 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In exemplary embodiments, the power reception control unit 292 may transmit the power control message through at least one of the wireless power signal and user data.

In order to transmit the foregoing power control message, the wireless power receiver 200 may further include a modulation/demodulation unit 293 electrically connected to the power receiving unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the wireless power receiver 200, respectively, to be used to transmit and receive a power control message through a wireless power signal will be described.

A wireless power signal formed by the power conversion unit 111 is received by the power receiving unit 291. At this time, the power reception control unit 292 controls the power communications modulation/demodulation unit 293 at the side of the wireless power receiver 200 to modulate the wireless power signal. For instance, the power reception control unit 292 may perform a modulation process such that a power amount received from the wireless power signal is varied by changing a reactance of the power communications modulation/demodulation unit 293 connected to the power receiving unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the power reception control unit 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet.

In addition, the power reception control unit 292 may transmit a power control message to the wireless power transmitter 100 by transmitting user data including the power control message by a communication means (not shown) included in the wireless power receiver 200.

[For Supporting in-band Two-Way Communication]

Under a wireless power transfer environment allowing for bi-directional communications according to the exemplary embodiments disclosed herein, the power reception control unit 292 may receive data to the wireless power transmitter 100. The data transmitted by the wireless power transmitter 100 may be transmitted to request the wireless power receiver 200 to send the power control message.

In addition, the power supply unit 290 may further include a charger 298 and a battery 299.

The wireless power receiver 200 receiving power for operation from the power supply unit 290 may be operated by power transferred from the wireless power transmitter 100, or operated by charging the battery 299 using the transferred power and then receiving the charged power. At this time, the power reception control unit 292 may control the charger 298 to perform charging using the transferred power.

Hereinafter, description will be given of a wireless power transmitter and a wireless power receiver applicable to the exemplary embodiments disclosed herein. First, a method of allowing the wireless power transmitter to transfer power to the electronic device according to the inductive coupling method will be described with reference to FIGS. 3 through 5.

Inductive Coupling Method

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the wireless power receiver 200.

According to the foregoing method, the power conversion unit 111 of the wireless power transmitter 100 may include a transmitting (Tx) coil 1111a being operated as a primary coil in magnetic induction. Furthermore, the power receiving unit 291 of the wireless power receiver 200 may include a receiving (Rx) coil 2911*a* being operated as a secondary coil in magnetic induction.

First, the wireless power transmitter 100 and wireless power receiver 200 are disposed in such a manner that the transmitting coil 1111*a* at the side of the wireless power transmitter 100 and the receiving coil at the side of the wireless power receiver 200 are located adjacent to each other. Then, if the power transmission control unit 112 controls a current of the transmitting coil (Tx coil) 1111*a* to be changed, then the power receiving unit 291 controls power to be supplied to the wireless power receiver 200 using an electromotive force induced to the receiving coil (Rx coil) 2911*a*.

The efficiency of wireless power transfer by the inductive coupling method may be little affected by a frequency characteristic, but affected by an alignment and distance between the wireless power transmitter 100 and the wireless power receiver 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting coil 1111*a* may be mounted at a lower portion of the interface surface. In this case, a vertical spacing is formed in a small-scale between the transmitting coil 1111*a* mounted at a lower portion of the interface surface and the receiving coil 2911*a* of the wireless power receiver 200 placed at an upper portion of the interface surface, and thus a distance between the coils becomes sufficiently small to efficiently implement contactless power transfer by the inductive coupling method.

Furthermore, an alignment indicator (not shown) indicating a location where the wireless power receiver 200 is to be placed at an upper portion of the interface surface. The alignment indicator indicates a location of the wireless power receiver 200 where an alignment between the transmitting coil 1111*a* mounted at a lower portion of the interface surface and the receiving coil 2911*a* can be suitably implemented. The alignment indicator may alternatively be simple marks, or may be formed in the form of a protrusion structure for guiding the location of the wireless power receiver 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the wireless power receiver 200.

On the other hand, the wireless power transmitter 100 may be formed to include one or more transmitting coils. The wireless power transmitter 100 may selectively use some of coils suitably arranged with the receiving coil 2911*a* of the wireless power receiver 200 among the one or more transmitting coils to enhance the power transmission efficiency. The wireless power transmitter 100 including the one or more transmitting coils will be described later with reference to FIG. 5.

Hereinafter, configurations of the wireless power transmitter and electronic device using an inductive coupling method applicable to the embodiments disclosed herein will be described in detail.

Wireless Power Transmitter and Electronic Device in Inductive Coupling Method

FIGS. 4A and 4B are block diagrams illustrating part of the wireless power transmitter 100 and wireless power receiver 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the wireless power receiver 200 will be described with reference to FIG. 4B.

Referring to FIG. 4A, the power conversion unit 111 of the wireless power transmitter 100 may include a transmitting (Tx) coil 1111*a* and an inverter 1112.

The transmitting coil 1111*a* may form a magnetic field corresponding to the wireless power signal according to a change of current as described above. The transmitting coil 1111*a* may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111*a* and a capacitor (not shown) to form a magnetic field in the transmitting coil 1111*a*.

In addition, the power conversion unit 111 may further include a positioning unit 1114.

The positioning unit 1114 may move or rotate the transmitting coil 1111*a* to enhance the effectiveness of contactless power transfer using the inductive coupling method. As described above, it is because an alignment and distance between the wireless power transmitter 100 and the wireless power receiver 200 including a primary coil and a secondary coil may affect power transfer using the inductive coupling method. In particular, the positioning unit 1114 may be used when the wireless power receiver 200 does not exist within an active area of the wireless power transmitter 100.

Accordingly, the positioning unit 1114 may include a drive unit (not shown) for moving the transmitting coil 1111*a* such that a center-to-center distance of the transmitting coil 1111*a* of the wireless power transmitter 100 and the receiving coil 2911*a* of the wireless power receiver 200 is within a predetermined range, or rotating the transmitting coil 1111*a* such that the centers of the transmitting coil 1111*a* and the receiving coil 2911*a* are overlapped with each other.

For this purpose, the wireless power transmitter 100 may further include a detection unit (not shown) made of a sensor for detecting the location of the wireless power receiver 200, and the power transmission control unit 112 may control the positioning unit 1114 based on the location information of the wireless power receiver 200 received from the location detection sensor.

Furthermore, to this end, the power transmission control unit 112 may receive control information on an alignment or distance to the wireless power receiver 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting coil 1111*a*. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting coil 1111*a*.

Referring to FIG. 4B, the power supply unit 290 of the wireless power receiver 200 may include a receiving (Rx) coil 2911*a* and a rectifier 2913.

A current is induced into the receiving coil 2911*a* by a change of the magnetic field formed in the transmitting coil 1111*a*. The implementation type of the receiving coil 2911*a* may be a planar spiral type or cylindrical solenoid type similarly to the transmitting coil 1111*a*.

Furthermore, series and parallel capacitors may be configured to be connected to the receiving coil 2911*a* to enhance the effectiveness of wireless power reception or perform resonant detection.

The receiving coil 2911*a* may be in the form of a single coil or a plurality of coils.

The rectifier 2913 performs a full-wave rectification to a current to convert alternating current into direct current. The rectifier 2913, for instance, may be implemented with a full-bridge rectifier made of four diodes or a circuit using active components.

In addition, the rectifier 2913 may further include a regulator for converting a rectified current into a more flat and stable direct current. Furthermore, the output power of the rectifier 2913 is supplied to each constituent element of the power supply unit 290. Furthermore, the rectifier 2913 may further include a DC-DC converter for converting output DC power into a suitable voltage to adjust it to the power required for each constituent element (for instance, a circuit such as a charger 298).

The power communications modulation/demodulation unit 293 may be connected to the power receiving unit 291, and may be configured with a resistive element in which resistance varies with respect to direct current, and may be configured with a capacitive element in which reactance varies with respect to alternating current. The power reception control unit 292 may change the resistance or reactance of the power communications modulation/demodulation unit 293 to modulate a wireless power signal received to the power receiving unit 291.

On the other hand, the power supply unit 290 may further include a power sensing unit 2914. The power sensing unit 2914 at the side of the wireless power receiver 200 monitors a voltage and/or current of the power rectified by the rectifier 2913, and if the voltage and/or current of the rectified power exceeds a threshold value as a result of monitoring, then the power reception control unit 292 transmits a power control message to the wireless power transmitter 100 to transfer suitable power.

Wireless Power Transmitter Configured to Include One or More Transmitting Coils

FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111*a*-1 to 1111*a*-n. The one or more transmitting coils 1111*a*-1 to 1111*a*-n may be an array of partly overlapping primary coils. An active area may be determined by some of the one or more transmitting coils.

The one or more transmitting coils 1111*a*-1 to 1111*a*-n may be mounted at a lower portion of the interface surface. Furthermore, the power conversion unit 111 may further include a multiplexer 1113 for establishing and releasing the connection of some of the one or more transmitting coils 1111*a*-1 to 1111*a*-n.

Upon detecting the location of the wireless power receiver 200 placed at an upper portion of the interface surface, the power transmission control unit 112 may take the detected location of the wireless power receiver 200 into consideration to control the multiplexer 1113, thereby allowing coils that can be placed in an inductive coupling relation to the receiving coil 2911*a* of the wireless power receiver 200 among the one or more transmitting coils 1111*a*-1 to 1111*a*-n to be connected to one another.

For this purpose, the power transmission control unit 112 may acquire the location information of the wireless power receiver 200. For example, the power transmission control unit 112 may acquire the location of the wireless power receiver 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111*a*-1 to 1111*a*-n , respectively, and determines whether it is located adjacent to which one of the one or more transmitting coils based on the received result, thereby acquiring the location information of the wireless power receiver 200.

On the other hand, the active area as part of the interface surface may denote a portion through which a magnetic field with a high efficiency can pass when the wireless power transmitter 100 transfers power to the wireless power receiver 200 in a wireless manner. At this time, a single transmitting coil or a combination of one or more transmitting coils forming a magnetic field passing through the active area may be designated as a primary cell. Accordingly, the power transmission control unit 112 may determine an active area based on the detected location of the wireless power receiver 200, and establish the connection of a primary cell corresponding to the active area to control the multiplexer 1113, thereby allowing the receiving coil 2911*a* of the wireless power receiver 200 and the coils belonging to the primary cell to be placed in an inductive coupling relation.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Resonance Coupling Method

FIG. 6 is a view illustrating a concept in which power is transferred to an electronic device from a wireless power transmitter in a wireless manner according to a resonance coupling method.

First, resonance will be described in brief as follows. Resonance refers to a phenomenon in which amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the wireless power receiver 200 by the formed magnetic field, then power is generated by the resonance phenomenon in the wireless power receiver 200.

The resonant frequency may be determined by the following formula in Equation 1.

$$f = \frac{1}{2\pi\sqrt{LC}} \qquad \text{[Equation 1]}$$

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting (Tx) coil 1111*b* in which a magnetic field is formed and a resonant circuit 1116 connected to the transmitting coil 1111*b* to determine a specific vibration frequency. The resonant circuit 1116 may be implemented by using a capacitive circuit (capacitors), and the specific vibration frequency may be determined based on an inductance of the transmitting coil 1111*b* and a capacitance of the resonant circuit 1116.

The configuration of a circuit element of the resonant circuit 1116 may be implemented in various forms such that the power conversion unit 111 forms a magnetic field, and is not limited to a form of being connected in parallel to the transmitting coil 1111*b* as illustrated in FIG. 6.

Furthermore, the power receiving unit 291 of the wireless power receiver 200 may include a resonant circuit 2912 and a receiving (Rx) coil 2911*b* to generate a resonance phenomenon by a magnetic field formed in the wireless power transmitter 100. In other words, the resonant circuit 2912 may be also implemented by using a capacitive circuit, and the resonant circuit 2912 is configured such that a resonant frequency determined based on an inductance of the receiving coil 2911*b* and a capacitance of the resonant circuit 2912 has the same frequency as a resonant frequency of the formed magnetic field.

The configuration of a circuit element of the resonant circuit 2912 may be implemented in various forms such that the power receiving unit 291 generates resonance by a magnetic field, and is not limited to a form of being connected in series to the receiving coil 2911*b* as illustrated in FIG. 6.

The specific vibration frequency in the wireless power transmitter 100 may have LTX, CTX, and may be acquired by using the Equation 1. Here, the wireless power receiver 200 generates resonance when a result of substituting the LRX and CRX of the wireless power receiver 200 to the Equation 1 is same as the specific vibration frequency.

According to a contactless power transfer method by resonance coupling, when the wireless power transmitter 100 and wireless power receiver 200 resonate at the same frequency, respectively, an electromagnetic wave is propagated through a short-range magnetic field, and thus there exists no energy transfer between the devices if they have different frequencies.

As a result, an efficiency of contactless power transfer by the resonance coupling method is greatly affected by a frequency characteristic, whereas the effect of an alignment and distance between the wireless power transmitter 100 and the wireless power receiver 200 including each coil is relatively smaller than the inductive coupling method.

Hereinafter, the configuration of a wireless power transmitter and an electronic device in the resonance coupling method applicable to the embodiments disclosed herein will be described in detail.

Wireless Power Transmitter in Resonance Coupling Method

FIGS. 7A and 7B are block diagrams illustrating part of the wireless power transmitter 100 and wireless power receiver 200 in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111*b*, an inverter 1112, and a resonant circuit 1116. The inverter 1112 may be configured to be connected to the transmitting coil 1111*b* and the resonant circuit 1116.

The transmitting coil 1111*b* may be mounted separately from the transmitting coil 1111*a* for transferring power according to the inductive coupling method, but may transfer power in the inductive coupling method and resonance coupling method using one single coil.

The transmitting coil 1111*b*, as described above, forms a magnetic field for transferring power. The transmitting coil 1111*b* and the resonant circuit 1116 generate resonance when alternating current power is applied thereto, and at this time, a vibration frequency may be determined based on an inductance of the transmitting coil 1111*b* and a capacitance of the resonant circuit 1116.

For this purpose, the inverter 1112 transforms a DC input obtained from the power supply unit 190 into an AC waveform, and the transformed AC current is applied to the transmitting coil 1111*b* and the resonant circuit 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit 1116 to change a capacitance, or include a motor for adjusting a number of turns or diameter of the transmitting coil 1111b to change an inductance, or include active elements for determining the capacitance and/or inductance On the other hand, the power conversion unit 111 may further include a power sensing unit 1115. The operation of the power sensing unit 1115 is the same as the foregoing description.

Referring to FIG. 7B, a configuration of the power supply unit 290 included in the wireless power receiver 200 will be described. The power supply unit 290, as described above, may include the receiving (Rx) coil 2911b and resonant circuit 2912.

In addition, the power receiving unit 291 of the power supply unit 290 may further include a rectifier 2913 for converting an AC current generated by resonance phenomenon into DC. The rectifier 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

Wireless Power Transmitter Configured to Include One or More Transmitting Coils

FIG. 8 is a block diagram illustrating a wireless power transmitter configured to have one or more transmission coils receiving power according to a resonance coupling method that can be employed in the embodiments disclosed herein.

Referring to FIG. 8, the power conversion unit 111 of the wireless power transmitter 100 according to the embodiments disclosed herein may include one or more transmitting coils 1111b-1 to 1111b-n and resonant circuits (1116-1 to 1116-n) connected to each transmitting coils. Furthermore, the power conversion unit 111 may further include a multiplexer 1113 for establishing and releasing the connection of some of the one or more transmitting coils 1111b-1 to 1111b-n.

The one or more transmitting coils 1111b-1 to 1111b-n may be configured to have the same vibration frequency, or some of them may be configured to have different vibration frequencies. It is determined by an inductance and/or capacitance of the resonant circuits (1116-1 to 1116-n) connected to the one or more transmitting coils 1111b-1 to 1111b-n, respectively.

For this purpose, the frequency adjustment unit 1117 may be configured to change an inductance and/or capacitance of the resonant circuits (1116-1 to 1116-n) connected to the one or more transmitting coils 1111b-1 to 1111b-n, respectively.

In-band Communication

FIG. 9 a view illustrating the concept of transmitting and receiving a packet between a wireless power transmitter and a wireless power receiver through the modulation and demodulation of a wireless power signal in transferring power in a wireless manner disclosed herein.

As illustrated in FIG. 9, the power conversion unit 111 included in the wireless power transmitter 100 may generate a wireless power signal. The wireless power signal may be generated through the transmitting coil 1111 included in the power conversion unit 111.

The wireless power signal 10a generated by the power conversion unit 111 may arrive at the wireless power receiver 200 so as to be received through the power receiving unit 291 of the wireless power receiver 200. The generated wireless power signal may be received through the receiving coil 2911 included in the power receiving unit 291.

The power reception control unit 292 may control the modulation/demodulation unit 293 connected to the power receiving unit 291 to modulate the wireless power signal while the wireless power receiver 200 receives the wireless power signal. When the received wireless power signal is modulated, the wireless power signal may form a closed-loop within a magnetic field or an electro-magnetic field. This may allow the wireless power transmitter 100 to sense a modulated wireless power signal 10b. The modulation/demodulation unit 113 may demodulate the sensed wireless power signal and decode the packet from the demodulated wireless power signal.

The modulation method employed for the communication between the wireless power transmitter 100 and the wireless power receiver 200 may be an amplitude modulation. As aforementioned, the amplitude modulation is a backscatter modulation may be a backscatter modulation method in which the power communications modulation/demodulation unit 293 at the side of the wireless power receiver 200 changes an amplitude of the wireless power signal 10a formed by the power conversion unit 111 and the power reception control unit 292 at the side of the wireless power transmitter 100 detects an amplitude of the modulated wireless power signal 10b.

Modulation and Demodulation of Wireless Power Signal

Hereinafter, description will be given of modulation and demodulation of a packet, which is transmitted or received between the wireless power transmitter 100 and the wireless power receiver 200 with reference to FIGS. 10, 11A, 11B and 11C.

FIG. 10 is a view illustrating a configuration of transmitting or receiving a power control message in transferring power in a wireless manner disclosed herein, and FIGS. 11A, 11B and 11C are view illustrating forms of signals upon modulation and demodulation executed in the wireless power transfer disclosed herein.

Referring to FIG. 10, the wireless power signal received through the power receiving unit 291 of the wireless power receiver 200, as illustrated in FIG. 11A, may be a nonmodulated wireless power signal 51. The wireless power receiver 200 and the wireless power transmitter 100 may establish a resonance coupling according to a resonant frequency, which is set by the resonant circuit 2912 within the power receiving unit 291, and the wireless power signal 51 may be received through the receiving coil 2911b.

The power reception control unit 292 may modulate the wireless power signal 51 received through the power receiving unit 291 by changing a load impedance within the modulation/demodulation unit 293. The modulation/demodulation unit 293 may include a passive element 2931 and an active element 2932 for modulating the wireless power signal 51. The modulation/demodulation unit 293 may modulate the wireless power signal 51 to include a packet, which is desired to be transmitted to the wireless power transmitter 100. Here, the packet may be input into the active element 2932 within the modulation/demodulation unit 293.

Afterwards, the power transmission control unit 112 of the wireless power transmitter 100 may demodulate a modulated wireless power signal 52 through an envelop detection, and decode the detected signal 53 into digital data 54. The demodulation may detect a current or voltage flowing into the power conversion unit 111 to be classified into two phases, a HI phase and a LO phase, and acquire a packet to be transmitted by the wireless power receiver 200 based on digital data classified according to the phases.

Hereinafter, a process of allowing the wireless power transmitter 100 to acquire a power control message to be transmitted by the wireless power receiver 200 from the demodulated digital data will be described.

Referring to FIG. 11B, the power transmission control unit 112 detects an encoded bit using a clock signal (CLK) from an envelope detected signal. The detected encoded bit is encoded according to a bit encoding method used in the modulation process at the side of the wireless power receiver 200. The bit encoding method may correspond to any one of non-return to zero (NRZ) and bi-phase encoding.

For instance, the detected bit may be a differential bi-phase (DBP) encoded bit. According to the DBP encoding, the power reception control unit 292 at the side of the wireless power receiver 200 is allowed to have two state transitions to encode data bit 1, and to have one state transition to encode data bit 0. In other words, data bit 1 may be encoded in such a manner that a transition between the HI phase and LO phase is generated at a rising edge and falling edge of the clock signal, and data bit 0 may be encoded in such a manner that a transition between the HI phase and LO phase is generated at a rising edge of the clock signal.

On the other hand, the power transmission control unit 112 may acquire data in a byte unit using a byte format constituting a packet from a bit string detected according to the bit encoding method. For instance, the detected bit string may be transferred by using an 11-bit asynchronous serial format as illustrated in FIG. 11C. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

[For Supporting in-Band Two-Way Communication]

As aforementioned, FIG. 9 has illustrated that the wireless power receiver 200 transmits a packet using a carrier signal 10a formed by the wireless power transmitter 100. However, the wireless power transmitter 100 may also transmit data to the wireless power receiver 200 by a similar method.

That is, the power transmission control unit 112 may control the modulation/demodulation unit 113 to modulate data, which is to be transmitted to the wireless power receiver 200, such that the data can be included in the carrier signal 10a. Here, the power reception control unit 292 of the wireless power receiver 200 may control the modulation/demodulation unit 293 to execute demodulation so as to acquire data from the modulated carrier signal 10a.

Packet Format

Hereinafter, description will be given of a structure of a packet used in communication using a wireless power signal according to the exemplary embodiments disclosed herein.

FIGS. 12A, 12B and 12C are view illustrating a packet including a power control message used in a contactless (wireless) power transfer method according to the embodiments disclosed herein.

As illustrated in FIG. 12A, the wireless power transmitter 100 and the wireless power receiver 200 may transmit and receive data desired to transmit in a form of a command packet (command_packet) 510. The command packet 510 may include a header 511 and a message 512.

The header 511 may include a field indicating a type of data included in the message 512. Size and type of the message may be decided based on a value of the field which indicates the type of data.

The header 511 may include an address field for identifying a transmitter (originator) of the packet. For example, the address field may indicate an identifier of the wireless power receiver 200 or an identifier of a group to which the wireless power receiver 200 belongs. When the wireless power receiver 200 transmits the packet 510, the wireless power receiver 200 may generate the packet 510 such that the address field can indicate identification information related to the receiver 200 itself.

The message 512 may include data that the originator of the packet 510 desires to transmit. The data included in the message 512 may be a report, a request or a response for the other party.

According to one exemplary embodiment, the command packet 510 may be configured as illustrated in FIG. 12B. The header 511 included in the command packet 510 may be represented with a predetermined size. For example, the header 511 may have a 2-byte size.

The header 511 may include a reception address field. For example, the reception address field may have a 6-bit size.

The header 511 may include an operation command field (OCF) or an operation group field (OGF). The OGF is a value given for each group of commands for the wireless power receiver 200, and the OCF is a value given for each command existing in each group in which the wireless power receiver 200 is included.

The message 512 may be divided into a length field 5121 of a parameter and a value field 5122 of the parameter. That is, the originator of the packet 510 may generate the message by a length-value pair (5121a-5122a, etc.) of at least one parameter, which is required to represent data desired to transmit.

Referring to FIG. 12C, the wireless power transmitter 100 and the wireless power receiver 200 may transmit and receive the data in a form of a packet which further has a preamble 520 and a checksum 530 added to the command packet 510.

The preamble 520 may be used to perform synchronization with data received by the wireless power transmitter 100 and detect the start bit of the header 520. The preamble 520 may be configured to repeat the same bit. For instance, the preamble 520 may be configured such that data bit 1 according to the DBP encoding is repeated eleven to twenty five times.

The checksum 530 may be used to detect an error that can be occurred in the command packet 510 while transmitting a power control message.

Operation Phases

Hereinafter, description will be given of operation phases of the wireless power transmitter 100 and the wireless power receiver 200.

FIG. 13 illustrates the operation phases of the wireless power transmitter 100 and the wireless power receiver 200 according to the embodiments disclosed herein. Furthermore, FIGS. 14 to 18 illustrate the structures of packets including a power control message between the wireless power transmitter 100 and the wireless power receiver 200.

Referring to FIG. 13, the operation phases of the wireless power transmitter 100 and the wireless power receiver 200 for wireless power transfer may be divided into a selection phase (state) 610, a ping phase 620, an identification and configuration phase 630, and a power transfer phase 640.

The wireless power transmitter 100 detects whether or not objects exist within a range that the wireless power transmitter 100 can transmit power in a wireless manner in the selection phase 610, and the wireless power transmitter 100 sends a detection signal to the detected object and the wireless power receiver 200 sends a response to the detection signal in the ping phase 620.

Furthermore, the wireless power transmitter 100 identifies the wireless power receiver 200 selected through the previous phases and acquires configuration information for power transmission in the identification and configuration phase 630. The wireless power transmitter 100 transmits power to the wireless power receiver 200 while controlling power transmitted in response to a control message received from the wireless power receiver 200 in the power transfer phase 640.

Hereinafter, each of the operation phases will be described in detail.

1) Selection Phase

The wireless power transmitter 100 in the selection phase 610 performs a detection process to select the wireless power receiver 200 existing within a detection area. The detection area, as described above, refers to a region in which an object within the relevant area can affect on the characteristic of the power of the power conversion unit 111. Compared to the ping phase 620, the detection process for selecting the wireless power receiver 200 in the selection phase 610 is a process of detecting a change of the power amount for forming a wireless power signal in the power conversion unit at the side of the wireless power transmitter 100 to check whether any object exists within a predetermined range, instead of the scheme of receiving a response from the wireless power receiver 200 using a power control message. The detection process in the selection phase 610 may be referred to as an analog ping process in the aspect of detecting an object using a wireless power signal without using a packet in a digital format in the ping phase 620 which will be described later.

The wireless power transmitter 100 in the selection phase 610 can detect that an object comes in or out within the detection area. Furthermore, the wireless power transmitter 100 can distinguish the wireless power receiver 200 capable of transferring power in a wireless manner from other objects (for example, a key, a coin, etc.) among objects located within the detection area.

As described above, a distance that can transmit power in a wireless manner may be different according to the inductive coupling method and resonance coupling method, and thus the detection area for detecting an object in the selection phase 610 may be different from one another.

First, in case where power is transmitted according to the inductive coupling method, the wireless power transmitter 100 in the selection phase 610 can monitor an interface surface (not shown) to detect the alignment and removal of objects.

Furthermore, the wireless power transmitter 100 may detect the location of the wireless power receiver 200 placed on an upper portion of the interface surface. As described above, the wireless power transmitter 100 formed to include one or more transmitting coils may perform the process of entering the ping phase 620 in the selection phase 610, and checking whether or not a response to the detection signal is transmitted from the object using each coil in the ping phase 620 or subsequently entering the identification phase 630 to check whether identification information is transmitted from the object. The wireless power transmitter 100 may determine a coil to be used for contactless power transfer based on the detected location of the wireless power receiver 200 acquired through the foregoing process.

Furthermore, when power is transmitted according to the resonance coupling method, the wireless power transmitter 100 in the selection phase 610 can detect an object by detecting that any one of a frequency, a current and a voltage of the power conversion unit is changed due to an object located within the detection area.

On the other hand, the wireless power transmitter 100 in the selection phase 610 may detect an object by at least any one of the detection methods using the inductive coupling method and resonance coupling method. The wireless power transmitter 100 may perform an object detection process according to each power transmission method, and subsequently select a method of detecting the object from the coupling methods for contactless power transfer to advance to other phases 620, 630, 640.

On the other hand, for the wireless power transmitter 100, a wireless power signal formed to detect an object in the selection phase 610 and a wireless power signal formed to perform digital detection, identification, configuration and power transmission in the subsequent phases 620, 630, 640 may have a different characteristic in the frequency, strength, and the like. It is because the selection phase 610 of the wireless power transmitter 100 corresponds to an idle state for detecting an object, thereby allowing the wireless power transmitter 100 to reduce consumption power in the idle state or generate a specialized signal for effectively detecting an object.

2) Ping Phase

The wireless power transmitter 100 in the ping phase 620 performs a process of detecting the wireless power receiver 200 existing within the detection area through a power control message. Compared to the detection process of the wireless power receiver 200 using a characteristic of the wireless power signal and the like in the selection phase 610, the detection process in the ping phase 620 may be referred to as a digital ping process.

The wireless power transmitter 100 in the ping phase 620 forms a wireless power signal to detect the wireless power receiver 200, modulates the wireless power signal modulated by the wireless power receiver 200, and acquires a power control message in a digital data format corresponding to a response to the detection signal from the modulated wireless power signal. The wireless power transmitter 100 may receive a power control message corresponding to the response to the detection signal to recognize the wireless power receiver 200 which is a subject of power transmission.

The detection signal formed to allowing the wireless power transmitter 100 in the ping phase 620 to perform a digital detection process may be a wireless power signal formed by applying a power signal at a specific operating point for a predetermined period of time. The operating point may denote a frequency, duty cycle, and amplitude of the voltage applied to the transmitting (Tx) coil. The wireless power transmitter 100 may generate the detection signal generated by applying the power signal at a specific operating point for a predetermined period of time, and attempt to receive a power control message from the wireless power receiver 200.

On the other hand, the power control message corresponding to a response to the detection signal may be a message indicating strength of the wireless power signal received by the wireless power receiver 200. For example, the wireless power receiver 200 may transmit a signal strength packet 5100 including a message indicating the received strength of the wireless power signal as a response to the detection signal as illustrated in FIG. 14. The packet 5100 may include a header 5120 for notifying a packet indicating the signal strength and a message 5130 indicating strength of the power signal received by the wireless power receiver 200. The strength of the power signal within the message 5130 may be a value indicating a degree of inductive coupling or resonance coupling for power transmission between the wireless power transmitter 100 and the wireless power receiver 200.

The wireless power transmitter 100 may receive a response message to the detection signal to find the wireless power receiver 200, and then extend the digital detection process to enter the identification and configuration phase 630. In other words, the wireless power transmitter 100 maintains the power signal at a specific operating point subsequent to finding the wireless power receiver 200 to receive a power control message required in the identification and configuration phase 630.

However, if the wireless power transmitter 100 is not able to find the wireless power receiver 200 to which power can be transferred, then the operation phase of the wireless power transmitter 100 will be returned to the selection phase 610.

3) Identification and Configuration Phase

The wireless power transmitter 100 in the identification and configuration phase 630 may receive identification information and/or configuration information transmitted by the wireless power receiver 200, thereby controlling power transmission to be effectively carried out.

The wireless power receiver 200 in the identification and configuration phase 630 may transmit a power control message including its own identification information. For this purpose, the wireless power receiver 200, for instance, may transmit an identification packet 5200 including a message indicating the identification information of the wireless power receiver 200 as illustrated in FIG. 15A. The packet 5200 may include a header 5220 for notifying a packet indicating identification information and a message 5230 including the identification information of the electronic device. The message 5230 may include information (2531 and 5232) indicating a version of the contract for contactless power transfer, information 5233 for identifying a manufacturer of the wireless power receiver 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 15B will be transmitted in a separate manner. The packet 5300 may include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the wireless power receiver 200.

The wireless power receiver 200 may transmit a power control message including information on expected maximum power in the identification and configuration phase 630. To this end, the wireless power receiver 200, for instance, may transmit a configuration packet 5400 as illustrated in FIG. 16. The packet may include a header 5420 for notifying that it is a configuration packet and a message 5430 including information on the expected maximum power. The message 5430 may include power class 5431, information 5432 on expected maximum power, an indicator 5433 indicating a method of determining a current of a main cell at the side of the wireless power transmitter, and the number 5434 of optional configuration packets. The indicator 5433 may indicate whether or not a current of the main cell at the side of the wireless power transmitter is determined as specified in the contract for wireless power transfer.

On the other hand, the wireless power transmitter 100 may generate a power transfer contract which is used for power charging with the wireless power receiver 200 based on the identification information and/or configuration information. The power transfer contract may include the limits of parameters determining a power transfer characteristic in the power transfer phase 640.

The wireless power transmitter 100 may terminate the identification and configuration phase 630 and return to the selection phase 610 prior to entering the power transfer phase 640. For instance, the wireless power transmitter 100 may terminate the identification and configuration phase 630 to find another electronic device that can receive power in a wireless manner.

4) Power Transfer Phase

The wireless power transmitter 100 in the power transfer phase 640 transmits power to the wireless power receiver 200.

The wireless power transmitter 100 may receive a power control message from the wireless power receiver 200 while transferring power, and control a characteristic of the power applied to the transmitting coil in response to the received power control message. For example, the power control message used to control a characteristic of the power applied to the transmitting coil may be included in a control error packet 5500 as illustrated in FIG. 18. The packet 5500 may include a header 5520 for notifying that it is a control error packet and a message 5530 including a control error value. The wireless power transmitter 100 may control the power applied to the transmitting coil according to the control error value. In other words, a current applied to the transmitting coil may be controlled so as to be maintained if the control error value is "0," reduced if the control error value is a negative value, and increased if the control error value is a positive value.

The wireless power transmitter 100 may monitor parameters within a power transfer contract generated based on the identification information and/or configuration information in the power transfer phase 640. As a result of monitoring the parameters, if power transmission to the wireless power receiver 200 violates the limits included in the power transfer contract, then the wireless power transmitter 100 may cancel the power transmission and return to the selection phase 610.

The wireless power transmitter 100 may terminate the power transfer phase 640 based on a power control message transferred from the wireless power receiver 200.

For example, if the charging of a battery has been completed while charging the battery using power transferred by the wireless power receiver 200, then a power control message for requesting the suspension of wireless power transfer will be transferred to the wireless power transmitter 100. In this case, the wireless power transmitter 100 may receive a message for requesting the suspension of the power transmission, and then terminate wireless power transfer, and return to the selection phase 610.

For another example, the wireless power receiver 200 may transfer a power control message for requesting renegotiation or reconfiguration to update the previously generated power transfer contract. The wireless power receiver 200 may transfer a message for requesting the renegotiation of the power transfer contract when it is required a larger or smaller amount of power than the currently transmitted power amount. In this case, the wireless power transmitter 100 may receive a message for requesting the renegotiation of the power transfer contract, and then terminate contactless power transfer, and return to the identification and configuration phase 630.

To this end, a message transmitted by the wireless power receiver 200, for instance, may be an end power transfer packet 5600 as illustrated in FIG. 18. The packet 5600 may include a header 5620 for notifying that it is an end power transfer packet and a message 5630 including an end power transfer code indicating the cause of the suspension. The end power transfer code may indicate any one of charge complete, internal fault, over temperature, over voltage, over current, battery failure, reconfigure, no response, and unknown error.

Communication Method of Plural Electronic Devices

Hereinafter, description will be given of a method by which at least one electronic device performs communication with one wireless power transmitter using wireless power signals.

FIG. 19 is a conceptual view illustrating a method of transferring power to at least one wireless power receiver from a wireless power transmitter.

The wireless power transmitter 100 may transmit power to one or more wireless power receivers 200 and 200'. FIG. 19 illustrates two electronic devices 200 and 200', but the methods according to the exemplary embodiments disclosed herein may not be limited to the number of electronic devices shown.

An active area and a detection area may be different according to the wireless power transfer method of the wireless power transmitter 100. Therefore, the wireless power transmitter 100 may determine whether there is a wireless power receiver located on the active area or the detection area according to the resonance coupling method or a wireless power receiver located on the active area or the detection area according to the induction coupling method. According to the determination result, the wireless power transmitter 100 which supports each wireless power transfer method may change the power transfer method for each wireless power receiver.

In the wireless power transfer according to the exemplary embodiments disclosed herein, when the wireless power transmitter 100 transfers power to the one or more electronic devices 200 and 200' according to the same wireless power transfer method, the electronic devices 200 and 200' may perform communications through the wireless power signals without inter-collision.

Referring to FIG. 19, a wireless power signal 10*a* generated by the wireless power transmitter 100 may arrive at the first electronic device 200' and the second electronic device 200, respectively. The first and second electronic devices 200' and 200 may transmit wireless power messages using the generated wireless power signal 10*a*.

The first electronic device 200' and the second electronic device 200 may operate as wireless power receivers for receiving a wireless power signal. The wireless power receiver in accordance with the exemplary embodiments disclosed herein may include a power receiving unit 291', 291 to receive the generated wireless power signal, a modulation/demodulation unit 293', 293 to modulate or demodulate the received wireless power signal, and a controller 292', 292 to control each component of the wireless power receiver.

In addition, the present disclosure provides a communication protocol selecting method in a wireless charging system (or a wireless power transmitter/receiver) employing multiple communication protocols, a structure of a transmitter interoperable with an induction method and a resonance method in a wireless charging system, and a communication method in a transmitter interoperable with an induction method and a resonance method.

Hereinafter, a wireless power transmitter performing many-to-one communication, a control method of the wireless power transmitter performing many-to-one communication, and a wireless charging station (or wireless power transmission system) performing many-to-one communication will be described in more detail with reference to the accompanying drawings.

FIGS. 20A and 20B are conceptual views illustrating a frame structure for performing communication according to the present invention. Furthermore, FIG. 21 is a conceptual view illustrating a sync pattern according to the present invention. FIG. 22 is a view illustrating a communication implementation method of a wireless power transmitter and a wireless power receiver, and FIG. 23 is a view illustrating the operation states of a wireless power transmitter and a wireless power receiver that perform many-to-one communication.

The wireless power transmitter 100 according to an embodiment of the present invention may transmit power in a wireless manner through the power conversion unit 111. At this time, the wireless power transmitter 100 may transmit power using an inductive coupling method and a resonance coupling method. Furthermore, the power conversion unit 111 of the wireless power transmitter 100 may include a single coil and a plurality of coils.

The wireless power transmitter 100 for performing a communication method may which will be described below include the foregoing single coil or plurality of coils.

Furthermore, a wireless power transmission system according to an embodiment of the present invention may perform communication to transmit and receive information between the wireless power transmitter and wireless power receiver. At this time, in the wireless power transmission system, one wireless power transmitter may perform communication with one wireless power receiver, and one wireless power transmitter may perform communication with a plurality of wireless power receivers.

At this time, a scheme of performing communication with one wireless power receiver may be defined as an inductive mode, and a scheme of performing communication with one or more wireless power receivers as a resonance mode. A magnetic field coupling coefficient of the inductive mode may be equal to or greater than 0.3, and a magnetic field coupling coefficient of the resonance mode may be equal to or less than 0.1.

As illustrated in FIGS. 20A and 20B, when the wireless power receiver is operated in a resonance mode, the wireless power transmitter 100 may perform communication in the unit of frame. The frame may denote a unit with a preset time length. For example, the frame may have a time interval of one second. In other words, the wireless power transmitter 100 may perform communication through a first frame for one second, and perform communication through a second frame for one second after the one second has passed.

At this time, referring to FIG. 20A, the frame may include a sync pattern. The sync pattern may perform the role of distinguishing each frame. Furthermore, the sync pattern may perform the function of optimizing communication with the wireless power receiver through a frame.

Referring to FIG. 21, the sync pattern may include a preamble, a start bit, a response field, an information field and a parity bit.

More specifically, the preamble consists of a number of bits, and the number of bits may be changed according to its operating frequency. The start bit may denote zero as a bit following the preamble. The zero may denote a slot sync if it is "0", and denote a frame sync if it is "1".

The parity bit, as the last bit of the sync pattern, becomes "1" when the data fields (i.e., response, type, information field) of a sync pattern have even bits, and otherwise becomes "0".

More specifically, considering the data fields (i.e., response, type, information field), the response field may include response information on the implementation of communication from the wireless power receiver within a slot prior to the sync pattern. For example, the response field may include response information such as when the implementation of communication is not sensed, when a communication error occurs, when a data packet is correctly checked from the wireless power receiver, and when a data packet is rejected from the wireless power receiver.

Furthermore, the sync field may be a type field indicating the type of sync pattern. More specifically, as a first sync pattern of the frame, the field may denote a frame sync (for example, set to "1") when located prior to a measurement field. Furthermore, the other sync fields may denote a slot sync (for example, set to "0") in a slotted frame.

Furthermore, the meaning of a value of the usage field, as an information field, may be determined according to the type of a sync pattern indicated by the sync field. For example, when the sync field is "1", the meaning of the usage field may indicate the type of frame. In other words, the usage field may notify that a current frame is a slotted frame or free-format frame. Otherwise, when the sync field is "0", the usage field may indicate the state of a slot. In other words, the usage field may notify information on whether the next slot is a slot allocated to a specific wireless power receiver, a slot temporarily locked by a specific wireless power receiver or a slot in which a wireless power receiver is freely used.

Furthermore, as illustrated in FIG. 20A, the frame may consist of two types of frames, such as a slotted frame and a free-format frame. The slotted frame is a frame with a plurality of slots, and the free-format frame is a frame with no plurality of slots.

The slotted frame may have a measurement slot in which a wireless power transmitter and a wireless power receiver freely perform communication subsequent to the sync signal.

The slotted frame may have a plurality of slots for performing communication with a wireless power receiver subsequent to the measurement slot. For example, the number of slots may be set to nine. The slot may have a specific time interval. For example, the slot may be formed to have a time interval of 50 ms.

The slot may include at least one of an allocated slot, a free slot, a measurement slot and a locked slot. The allocated slot is a slot used by a specific wireless power receiver, and the free slot is a slot in which a wireless power receiver is freely used, and the measurement slot is a slot that does not perform communication with a wireless power receiver to measure transmitted and received power, and the locked slot is a slot that is temporarily locked to be used by a specific receiver.

On the other hand, the free-format frame may not have an additional specific format subsequent to the measurement slot. In this case, the wireless power receiver can transmit data packets having a long length through the free-format frame.

On the other hand, referring to FIG. 20B, the frame may have a sync pattern for each slot, but have one sync pattern (shown as REQUEST in FIG. 20B) for each frame without having a sync pattern for each slot. At this time, REQUEST in FIG. 20B performing the same role of the sync in FIG. 20A, may indicate the start of a frame. Furthermore, REQUEST in FIG. 20B may be an interval of transmitting a signal that requests specific data packet to a wireless power receiver.

Hereinafter, a communication implementation method of a wireless power transmitter being operated in a resonance mode will be described in more detail.

Referring to FIG. 23, a wireless power transmitter supporting a resonance mode according to an embodiment of the present invention may be divided into a selection phase 2000, an introduction phase 2010, a configuration phase 2020, a negotiation phase 2030, and a power transfer phase 2040.

First, the wireless power transmitter 100 according to an embodiment of the present invention may transmit a wireless power signal to sense a wireless power receiver. In other words, as illustrated in FIG. 13, the process of sensing a wireless power receiver using such a wireless power signal may be referred to as an analog ping.

Upon sensing the wireless power receiver, the wireless power transmitter 100 may transmit a power control message to the wireless power receiver. The process of detecting a wireless power receiver using the power control message may be referred to as a digital ping.

The wireless power receiver that has received the wireless power signal may enter the selection phase 2000. The wireless power receiver that has entered the selection phase 2000 may determine whether or not a frequency shift keying (FSK) is contained in the power control message. The FSK signal may be a signal for providing synchronization information, operating frequency and other information to the wireless power receiver.

At this time, the wireless power receiver may perform communication with any one scheme in an inductive mode or resonance mode according to whether or not the FSK signal is contained therein.

More specifically, the wireless power receiver may be operated in a resonance mode if the FSK signal is contained in the wireless power signal, and otherwise operated in an inductive mode.

When the wireless power receiver is operated in an inductive mode, the wireless power receiver may perform the foregoing communication scheme illustrated in FIG. 13.

When the wireless power receiver is operated in a resonance mode, the wireless power transmitter 100 may enter the introduction phase 2010. Referring to FIG. 23, the wireless power transmitter 100 may transmit a sync pattern for notify the start of a first frame to the wireless power receiver during the introduction phase 2010.

Furthermore, the wireless power transmitter 100 may transmit a sync pattern indicating a first slot among a plurality of slots constituting the first frame to a first wireless power receiver.

Then, the wireless power transmitter 100 may receive a control information (CI) packet from the first wireless power receiver within the first slot. Here, the control information (CI) packet may include received power value information, control error value information, and the like.

On the other hand, the wireless power transmitter 100 may immediately receive a CI packet from a wireless power receiver within the first slot without transmitting the sync pattern indicating the first slot.

When the control information packet is sensed, the wireless power transmitter 100 may transmit an ACK (Acknowledge) or NAK (not-Acknowledge) signal to the first wireless power receiver within the first slot. At this time, the wireless power transmitter 100 may transmit the ACK signal when the control information packet is successfully received within the first slot, and transmit the NAK signal when a second wireless power receiver different from the first wireless power receiver that has transmitted the control information packet carries out the configuration phase 2020 or negotiation phase 2030.

If the ACK signal is received at the first wireless power receiver, then the wireless power transmitter may allocate the first slot to the first wireless power receiver. At this time, the wireless power receiver may transmit a control information packet using the allocated first slot during the configuration phase 2020, negotiation phase 2030, and power transfer phase 2040.

On the contrary, when the NAK signal is received at the wireless power receiver, the first wireless power receiver may transmit the control information packet again to a second slot different from the first slot until receiving the ACK since the first slot is not allocated thereto.

When the first slot is allocated thereto, the first wireless power receiver may enter the configuration phase 2020. At this time, the first wireless power transmitter 100 may provide locked slots during the configuration phase 2020 to receive data packets (for example, identification data packets (IDHI packet, IDLO packet), optionally proprietary data packets, GFB packet, etc.) from the wireless power receiver.

The locked slots may be at least part of free slots subsequent to the allocated first slot. Even at this time, the first wireless power receiver continuously transmit a control information packet through the first slot.

The first wireless power transmitter 100 may receive data packets through the locked slots during the configuration phase 2020, and then enter the negotiation phase 2030. The first wireless power transmitter 100 may continuously provide locked slots during the configuration phase 2020, and receive one or more negotiation data packets from the first wireless power receiver. For example, the first wireless power receiver may receive negotiation data packets (specific request packet (SRQ) and general request packet (GRQ)) and optional proprietary packets using locked slots during the configuration phase 2020.

Even at this time, the first wireless power receiver may continuously transmit a control information packet through the first slot.

When an SRQ/end-negotiation packet is received from the first wireless power receiver, the wireless power transmitter 100 may transmit an ACK signal. At this time, upon receiving an ACK signal to the SRQ/end-negotiation packet, the first wireless power receiver may enter the power transfer phase 2040.

At this time, the power transfer phase 2040 may denote a state of transmitting power in a wireless manner. Furthermore, the wireless power transmitter 100 may no more provide locked slots during the power transfer phase 2040. At this time, the locked slots can be converted again into free slots.

At this time, the wireless power transmitter 100 may continuously allocate the first slot to the first wireless power receiver until power transmission is terminated or a specific data packet (for example, EPT-packet) is received from the first wireless power receiver. In this case, the first wireless power receiver may continuously transmit a control information packet using the first slot of each frame during the power transfer phase 2040.

Furthermore, the first wireless power receiver may transmit one or more data packets through a free packet during the 20040. For example, the first wireless power receiver may transmit an end power transfer packet (EPT), a charge status packet (CHS) and proprietary data packets within the free slot.

When EPT is received while transmitting power during the power transfer phase 2040, the wireless power transmitter 100 may terminate power transmission, enter the configuration phase 2020 again, or enter the negotiation phase 2030 again according to the information of the EPT packet.

If the wireless power transmitter 100 terminates the transmission of power, then the wireless power transmitter 100 may convert the allocated first slot into a free slot. Then, the wireless power transmitter 100 may enter the selection phase 2000 again.

Hereinafter, a scheme of allocating a slot to the wireless power transmitter 100 and wireless power receiver 200 capable of supporting a resonance mode will be described in more detail. FIG. 24 is a flow chart illustrating a collision solving mechanism in a wireless power receiver according to the present invention, and FIGS. 25A, 25B, 26A, 26B, 27A, 27B, 28A, 28B, 29A, 29B, 30A and 30B are views illustrating a method of allocating a slot in a wireless power transmitter according to the present invention.

When operated in a resonance mode, the wireless power transmitter 100 according to an embodiment of the present invention may allocate a slot to one or more wireless power receivers, respectively.

More specifically, referring to FIG. 24, when a data packet is received within any one free slot among a plurality of slots within a first frame from a wireless power receiver, and the free slot is available, the power transmission control unit 112 may successfully receive the data packet. At this time, a case where the free slot is available may denote a case where the free slot is not allocated to a specific wireless power receiver.

Furthermore, when the data packet is successfully received, the power transmission control unit 112 may convert at least part of free slots subsequent to the free slot into locked slots. Meanwhile, contrary to the illustration, the power transmission control unit 112 may not convert the free slots into locked slots even when the data packet is successfully received.

However, when the free slot is not available, the power transmission control unit 112 may transmit a communication error signal and determine that collision has occurred. At this time, a case where the free slot is not available may denote a case where the free slot is already allocated to a specific wireless power receiver or a case where data packets are received from at least two wireless power receivers within the free slot.

When determined that the collision has occurred, the wireless power receiver that has received the communication error signal may execute a collision solving mechanism to solve the collision. More specifically, the wireless power receiver may transmit a data packet using a free slot different from the free slot in which the collision has occurred to solve the collision.

In other words, the wireless power receiver may continuously transmit a data packet to another free slot until not receiving a communication error signal from the wireless power transmitter 100.

Hereinafter, a method of allocating a slot to one or more wireless power receivers will be described in more detail with reference to the accompanying drawings.

In the following description, a case where the first wireless power receiver transmits first information within a free slot, a case where the first and the second wireless power receiver transmit first and second information within the same free slot, and a case where the first wireless power transmitter receives the second information of the second wireless power transmitter within a first slot in a state that the first slot is allocated thereto will be described, respectively.

Furthermore, the following description may be applicable to both a frame structure in which a sync pattern is included in each slot and a structure in which subsequent to transmitting one sync pattern from the entire frame, an additional sync pattern is not included in each slot.

First, referring to FIG. 25A, the power transmission control unit 112 operated in a resonance mode may receive the first information of the first wireless power receiver in the introduction phase 2010 within a first slot among a plurality of slots of the first frame. Here, the first information may be information associated with the first wireless power receiver. For example, the first information may include a control information packet. For another example, the first information may be an identification information packet of the wireless power receiver.

At this time, the present invention may transmit a sync pattern indicating a first slot during the introduction phase 2010, and then receive first information within the first slot as illustrated in FIG. 25A, or immediately receive first information within the first slot without transmitting a sync pattern indicating the first slot as illustrated in FIG. 26A.

More specifically, the power transmission control unit 112 may receive first information within the first slot. At this time, as illustrated in FIGS. 25B and 26B, the power transmission control unit 112 may allocate the first slot to the first wireless power receiver.

Subsequent to allocating the first slot, the power transmission control unit 112 may provide locked slots. In other words, when a first slot is allocated, the power transmission control unit 112 may convert at least part of free slots among a plurality of slots into locked slots. For example, the power transmission control unit 112 may convert at least part of free slots subsequent to the first slot among the plurality of slots into locked slots. At this time, the first wireless power receiver may enter the configuration phase and negotiation phase using the locked slots.

On the other hand, the power transmission control unit 112 may not convert the at least part of free slots into locked slots. In this case, the power transmission control unit 112 may receive data packets using only a first slot with the first wireless power receiver during the configuration phase and negotiation phase.

The first wireless power receiver may continuously transmit first information (for example, control information packet) through the first slot of frames subsequent to the first and the second frame in the configuration phase, negotiation phase and power transfer phase.

At this time, referring to FIGS. 25B and 26B, the second wireless power receiver may receive second information within a sixth slot of the first frame. In this case, the wireless power transmitter 100 may allocate a sixth slot to the second wireless power receiver in the introduction phase 2010. As described above, the wireless power transmitter 100 may provide free slots subsequent to the second slot as locked slots. At this time, the locked slots may be at least part of free slots of the first frame and at least part of free slots of the second frame subsequent to the first frame. Furthermore, the second wireless power receiver may receive data packets during the configuration phase and negotiation phase using the locked slots.

On the other hand, the present invention may not convert the at least part of free slots into locked slots as described above. In this case, the power transmission control unit 112 may receive data packets using only a first slot with the first wireless power receiver.

Furthermore, referring to FIGS. 27A and 28A, the power transmission control unit 112 may receive the first information of the first wireless power receiver and the second information of the second wireless power receiver within a first slot of the first frame.

In this case, the first and the second wireless power receiver may execute the foregoing collision solving mechanism.

The first wireless power receiver that the collision solving mechanism has been carried out may transmit first information within a third slot different from the first slot of the first frame. At this time, referring to FIGS. 27B and 28B, the power transmission control unit 112 may allocate the third slot to the first wireless power receiver. Furthermore, the power transmission control unit 112 may provide free slots subsequent to the third slot to the first wireless power receiver.

Furthermore, referring to FIGS. 27A and 28A, the second wireless power receiver that the collision solving mechanism has been carried out may transmit the second information within a sixth slot different from the third slot within the first frame. In this case, referring to FIGS. 27B and 28B, the power transmission control unit 112 may allocate the sixth slot to the second wireless power receiver. Furthermore, the power transmission control unit 112 may provide free slots subsequent to the sixth slot as locked slots.

Furthermore, referring to FIGS. 29A and 30A, the power transmission control unit 112 may receive second information from the second wireless power receiver within the first slot in a state that the first slot is allocated to the first wireless power receiver. Here, similar to the first information, the second information may be a control information packet of the second wireless power receiver.

In this case, the second wireless power receiver may perform the foregoing collision solving mechanism. In other words, the second wireless power receiver may transmit second information again within a sixth slot different from the first slot. At this time, as illustrated in FIGS. 29B and 30B, when the sixth slot is available, the power transmission control unit 112 may allocate the sixth slot to the second wireless power receiver.

However, it would be easily understood by those skilled in the art that the configuration of a wireless power transmitter according to the embodiment disclosed herein may be applicable to an apparatus, such as a docking station, a terminal cradle device, and an electronic device, and the like, excluding a case where it is applicable to only a wireless charger.

The scope of the invention will not be limited to the embodiments disclosed herein, and thus various modifications, variations, and improvements can be made in the present invention without departing from the spirit of the invention, and within the scope of the appended claims.

The invention claimed is:

1. A communication method of a wireless power transmitter for transferring power in a wireless manner, the communication method comprising:
    allocating a slot among a plurality of slots to a first wireless power receiver, the slot being allocated to the first wireless power receiver for sending information of the first wireless power receiver to the wireless power transmitter while wireless power is transferred to the first wireless power receiver;
    transferring the wireless power to the first wireless power receiver by the wireless power transmitter;
    detecting a second wireless power receiver by the wireless power transmitter during the wireless power transfer to the first wireless power receiver;
    receiving first information from the first wireless power receiver and second information from the second wireless power receiver within a first slot among the plurality of slots, the first slot being unallocated; and
    transmitting a collision related signal to the first and second wireless power receivers such that a collision resolution mechanism is executed by each of the first and second wireless power receivers respectively.

2. The communication method of claim 1, wherein the first information includes at least one of an End Power Transfer packet (EPT) and a Charge Status packet (CHS), and
    wherein the collision resolution mechanism is executed in a manner that the first wireless power receiver transmits the first information to the wireless power transmitter after a first random delay and the second wireless power receiver transmits the second information to the wireless power transmitter after a second random delay.

3. The communication method of claim 1, wherein the first information is received within a second slot among the plurality of slots from the first wireless power receiver subsequent to executing the collision resolution mechanism.

4. The communication method of claim 3, wherein an acknowledge (ACK) signal is transmitted to the first wireless power receiver when the second slot is allocatable.

5. The communication method of claim 4, wherein a not-acknowledge (NAK) signal is transmitted to the first wireless power receiver when the second slot is in a non-allocatable state.

6. The communication method of claim 3, wherein the second slot is allocated to the first wireless power receiver when the first information is received within the second slot.

7. The communication method of claim 6, wherein the wireless power transmitter performs communication with the first wireless power receiver within the second slot.

8. The communication method of claim 3, wherein the second wireless power receiver is allocated to a third slot when the second information is received within the third slot different from the second slot.

9. The communication method of claim 8, wherein the wireless power transmitter performs communication with the second wireless power receiver through the third slot when the third slot is allocated thereto.

10. The communication method of claim 1, further comprising:
    transmitting a frequency shift keying (FSK) signal to the first and second wireless power receivers.

11. The communication method of claim 1, wherein the wireless power transmitter performs communication with the first and the second wireless power receiver in a time division multiplexing scheme using the plurality of slots.

12. A wireless power transmitter for transferring power in a wireless manner, the wireless power transmitter comprising:
    a power transmission unit configured to transfer power in a wireless manner; and
    a power transmission controller configured to:
        allocate a slot among a plurality of slots to a first wireless power receiver, wherein the slot is allocated to the first wireless power receiver for sending information of the first wireless power receiver to the wireless power transmitter while wireless power is transferred to the first wireless power receiver using the power transmission unit
        detect a second wireless power receiver during the wireless power transfer to the first wireless power receiver,
        receive first information from the first wireless power receiver and second information from the second wireless power receiver within a first slot among the plurality of slots, the first slot being unallocated, and
        transmit a collision related signal to the first and second wireless power receivers such that a collision resolution mechanism is executed by each of the first and second wireless power receivers respectively.

13. The wireless power transmitter of claim 12, wherein the first information includes at least one of an End Power Transfer packet (EPT) and a Charge Status packet (CHS), and
    wherein the collision resolution mechanism is executed in a manner that the first wireless power receiver transmits the first information to the wireless power transmitter after a first random delay and the second wireless power receiver transmits the second information to the wireless power transmitter after a second random delay.

14. The wireless power transmitter of claim 12, wherein the power transmission controller transmits an acknowledge (ACK) signal to the first wireless power receiver when the first information is received within a second slot.

15. The wireless power transmitter of claim 14, wherein a third slot is allocated to the second wireless power receiver when the second information is received within the third slot different from the second slot subsequent to transmitting a not-acknowledge (NAK) signal.

16. A wireless charging system, comprising:
    a transmitter formed to transfer wireless power; and
    a first receiver and a second receiver each formed to receive wireless power from the transmitter,
    wherein the transmitter allocates a slot among a plurality of slots to the first receiver,
    wherein the slot is allocated to the first receiver for sending information to the transmitter while wireless power is transferred to the first receiver,
    wherein the transmitter detects the second power receiver during the wireless power transfer to the first receiver, transmits a collision related signal to the first and second receivers when first information from the first receiver and second information from the second receiver are received within a first slot among the plurality of slots, the first slot being unallocated, and wherein each of the first and second receivers executes a collision resolution mechanism respectively upon receiving the collision related signal.

17. The wireless charging system of claim 16, wherein the first receiver transmits the first information to the transmitter through a second slot different from the first unallocated slot subsequent to executing the collision resolution mechanism, and the transmitter allocates the second slot to the first receiver when the first information is transmitted within the second slot.

18. The wireless charging system of claim 17, wherein the transmitter transmits an acknowledge (ACK) signal to the first receiver when the second slot is allocated to the first receiver.

19. The wireless charging system of claim 18, wherein the first receiver performs communication with the transmitter using the second slot when the second slot is allocated to the first receiver.

20. The wireless charging system of claim 16, wherein the transmitter transmits a frequency shift keying (FSK) signal to the first and second receivers.

* * * * *